United States Patent
Yarabolu

(10) Patent No.: US 12,177,229 B2
(45) Date of Patent: Dec. 24, 2024

(54) DETECTING AND PREVENTING BOTNET ATTACKS USING CLIENT-SPECIFIC EVENT PAYLOADS

(71) Applicant: Bank of America Corporation, Charlotte, NC (US)

(72) Inventor: Vijay Kumar Yarabolu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 370 days.

(21) Appl. No.: 17/680,937

(22) Filed: Feb. 25, 2022

(65) Prior Publication Data
US 2023/0275905 A1    Aug. 31, 2023

(51) Int. Cl.
    *H04L 9/40* (2022.01)
(52) U.S. Cl.
    CPC ........ *H04L 63/126* (2013.01); *H04L 63/1416* (2013.01); *H04L 63/1425* (2013.01); *H04L 63/1458* (2013.01)
(58) Field of Classification Search
    CPC ............... H04L 63/126; H04L 63/1416; H04L 63/1425; H04L 63/1458
    See application file for complete search history.

(56) References Cited

U.S. PATENT DOCUMENTS

| | | | | |
|---|---|---|---|---|
| 6,373,950 B1 * | 4/2002 | Rowney | ................. | G06Q 30/06 705/64 |
| 7,039,654 B1 * | 5/2006 | Eder | ....................... | G06Q 10/06 |
| 7,698,398 B1 * | 4/2010 | Lai | ........................ | G06Q 30/00 709/228 |
| 7,831,693 B2 * | 11/2010 | Lai | .......................... | H04L 67/02 709/218 |
| 8,069,435 B1 * | 11/2011 | Lai | ........................ | H04L 67/51 717/106 |
| 8,346,929 B1 * | 1/2013 | Lai | .......................... | H04L 67/51 709/226 |
| 8,433,785 B2 * | 4/2013 | Awadallah | .......... | G06F 11/3485 709/224 |

(Continued)

FOREIGN PATENT DOCUMENTS

CN    1968272 B    8/2011

*Primary Examiner* — Shanto Abedin
(74) *Attorney, Agent, or Firm* — Banner & Witcoff, Ltd.

(57) ABSTRACT

Aspects of the disclosure relate to detecting and preventing botnet attacks using client-specific event payloads. A computing platform may receive a request to access data within an enterprise organization. The computing platform may monitor the movement of peripheral devices that are used to populate the data access request and may detect an event associated with each movement. The computing platform may generate an alpha-numeric event code and an alpha-numeric user interface code for each event, determine the location of each event, and categorize each event. The computing platform may generate a client-specific event payload using the unique alpha-numeric codes and the location and categorization of the event. The computing platform may generate a simulated client event payload using the unique alpha-numeric codes. The computing platform may determine whether to approve or deny the data access request based on whether the client-specific event payload matches the simulated client event payload.

18 Claims, 13 Drawing Sheets

(56) References Cited

U.S. PATENT DOCUMENTS

| | | | |
|---|---|---|---|
| 8,838,430 B1* | 9/2014 | Lang | G06F 30/20 703/22 |
| 8,938,532 B2* | 1/2015 | Terrell | H04L 69/22 709/224 |
| 8,990,944 B1* | 3/2015 | Singh | G06F 21/53 726/24 |
| 9,009,834 B1* | 4/2015 | Ren | G06F 21/6209 709/224 |
| 9,015,019 B1* | 4/2015 | Kim | H04W 74/00 703/13 |
| 9,055,093 B2* | 6/2015 | Borders | H04L 63/1408 |
| 9,166,994 B2* | 10/2015 | Ward | H04L 63/1425 |
| 9,225,740 B1* | 12/2015 | Ismael | G06F 11/3664 |
| 9,306,969 B2* | 4/2016 | Dagon | H04L 63/1491 |
| 9,330,256 B2* | 5/2016 | Gupta | G06F 21/577 |
| 9,363,149 B1* | 6/2016 | Chauhan | H04L 43/045 |
| 9,397,901 B2* | 7/2016 | Majumdar | H04L 47/15 |
| 9,626,667 B2* | 4/2017 | Boccon-Gibod | H04L 63/10 |
| 9,680,861 B2* | 6/2017 | Ward | H04L 63/1441 |
| 9,894,088 B2* | 2/2018 | Ward | H04L 63/1425 |
| 9,942,228 B2* | 4/2018 | Hauser | H04L 63/10 |
| 10,230,718 B2* | 3/2019 | Idika | H04L 63/1416 |
| 10,296,748 B2* | 5/2019 | Telang | G06F 21/577 |
| 10,379,988 B2* | 8/2019 | Kochunni | G06F 11/1448 |
| 10,454,950 B1* | 10/2019 | Aziz | H04L 63/1425 |
| 10,498,744 B2* | 12/2019 | Hunt | H04L 41/0681 |
| 10,558,505 B2* | 2/2020 | Segal | G06Q 10/109 |
| 10,567,390 B2* | 2/2020 | Lee | H04W 12/63 |
| 10,594,720 B2* | 3/2020 | Dell'Era | H04L 63/1433 |
| 10,698,701 B1* | 6/2020 | De Jong | G06F 21/6245 |
| 10,885,143 B2* | 1/2021 | Nguyen | G06F 21/41 |
| 10,956,573 B2* | 3/2021 | Zheng | G06F 21/562 |
| 11,010,474 B2* | 5/2021 | Hu | G06F 11/3089 |
| 11,074,312 B2* | 7/2021 | Khoo | G06F 16/957 |
| 11,194,915 B2* | 12/2021 | Stolfo | G06F 21/577 |
| 11,210,391 B2* | 12/2021 | Xu | G06F 21/56 |
| 11,244,042 B2* | 2/2022 | Mullin | G06F 21/53 |
| 11,363,063 B2* | 6/2022 | Lotia | H04L 63/1466 |
| 11,397,808 B1* | 7/2022 | Prabhu | G06F 21/566 |
| 11,522,874 B2* | 12/2022 | Compton | H04L 45/70 |
| 11,539,454 B2* | 12/2022 | Purushothaman | H04L 1/0009 |
| 11,580,002 B2* | 2/2023 | Rome | G06V 10/762 |
| 11,606,378 B1* | 3/2023 | Delpont | H04L 43/16 |
| 11,818,167 B2* | 11/2023 | Holloway | H04L 63/1458 |
| 11,843,605 B2* | 12/2023 | Harguindeguy | H04L 63/0227 |
| 2003/0177187 A1* | 9/2003 | Levine | H04L 67/131 709/205 |
| 2004/0122637 A1* | 6/2004 | Askew | B64G 7/00 703/2 |
| 2008/0301808 A1* | 12/2008 | Calo | H04L 63/1408 726/23 |
| 2009/0094311 A1* | 4/2009 | Awadallah | H04L 63/1441 709/202 |
| 2010/0070620 A1* | 3/2010 | Awadallah | H04L 63/1425 709/224 |
| 2010/0275263 A1* | 10/2010 | Bennett | G06F 21/577 345/589 |
| 2010/0287229 A1* | 11/2010 | Hauser | H04L 67/535 709/206 |
| 2011/0167494 A1* | 7/2011 | Bowen | H04L 63/1491 726/24 |
| 2011/0283359 A1* | 11/2011 | Prince | H04L 63/0281 726/23 |
| 2012/0047256 A1* | 2/2012 | Hauser | G06N 20/00 709/224 |
| 2013/0086381 A1* | 4/2013 | Thomas | H04L 9/3234 713/168 |
| 2013/0191435 A1* | 7/2013 | Gittelman | G06F 16/954 709/201 |
| 2013/0333037 A1* | 12/2013 | Bowen | G06F 21/566 726/23 |
| 2014/0047527 A1* | 2/2014 | Ngo | H04L 63/08 726/7 |
| 2014/0115605 A1* | 4/2014 | Hodges | G06F 9/542 719/313 |
| 2014/0283067 A1* | 9/2014 | Call | H04L 63/1425 726/23 |
| 2014/0289869 A1* | 9/2014 | Hauser | H04L 63/0876 726/28 |
| 2014/0379621 A1* | 12/2014 | Hauser | G06F 21/316 706/12 |
| 2015/0112892 A1* | 4/2015 | Kaminsky | G06F 21/31 706/11 |
| 2015/0156084 A1* | 6/2015 | Kaminsky | H04L 43/04 709/224 |
| 2016/0156644 A1* | 6/2016 | Wang | H04L 63/1425 726/23 |
| 2016/0191554 A1* | 6/2016 | Kaminsky | H04L 63/1425 726/23 |
| 2016/0205122 A1* | 7/2016 | Bassett | H04L 63/1441 726/23 |
| 2016/0224768 A1* | 8/2016 | Boccon-Gibod | G06F 21/62 |
| 2017/0195356 A1* | 7/2017 | Turgeman | H04L 63/08 |
| 2017/0214701 A1* | 7/2017 | Hasan | H04L 63/1491 |
| 2018/0013784 A1* | 1/2018 | Rorabaugh | G06F 21/577 |
| 2018/0025135 A1* | 1/2018 | Odom | G06F 21/6209 726/28 |
| 2018/0091547 A1 | 3/2018 | St. Pierre | |
| 2018/0103047 A1* | 4/2018 | Turgeman | G06Q 20/4014 |
| 2018/0159932 A1* | 6/2018 | Berk | H04L 67/10 |
| 2018/0183819 A1* | 6/2018 | Le | G06F 21/55 |
| 2018/0183825 A1* | 6/2018 | Kurupati | G06F 21/566 |
| 2018/0357422 A1* | 12/2018 | Telang | G06F 21/577 |
| 2019/0007523 A1* | 1/2019 | Walker | H04L 67/56 |
| 2019/0102078 A1* | 4/2019 | Bhatt | G06F 3/0481 |
| 2019/0199759 A1* | 6/2019 | Anderson | G06Q 50/20 |
| 2019/0205184 A1* | 7/2019 | Zhang | G06F 9/542 |
| 2019/0205186 A1* | 7/2019 | Zhang | G06F 9/4843 |
| 2019/0268305 A1* | 8/2019 | Xu | H04L 61/5007 |
| 2020/0004962 A1* | 1/2020 | Araujo | G06F 21/568 |
| 2020/0074059 A1* | 3/2020 | Beckett, Jr. | G06F 21/36 |
| 2021/0092108 A1* | 3/2021 | Jen | G06F 21/31 |
| 2021/0320797 A1* | 10/2021 | Koorella | H04L 9/50 |
| 2022/0116411 A1* | 4/2022 | Melicher | H04L 63/0263 |
| 2022/0141194 A1* | 5/2022 | Xiao | H04L 63/1425 726/12 |
| 2022/0276728 A1* | 9/2022 | Jorasch | H04L 67/12 |
| 2022/0327199 A1* | 10/2022 | Papadopoulos | H04L 9/3226 |
| 2022/0383757 A1* | 12/2022 | Tavshikar | G08G 5/0026 |
| 2022/0400071 A1* | 12/2022 | Walters | H04L 43/06 |
| 2022/0407937 A1* | 12/2022 | Zavesky | H04L 67/54 |
| 2023/0004360 A1* | 1/2023 | Koneru | G06N 20/00 |
| 2023/0162092 A1* | 5/2023 | Rome | H04L 63/1425 706/12 |
| 2023/0259558 A1* | 8/2023 | Subramaniam | G06N 3/006 704/9 |
| 2023/0275905 A1* | 8/2023 | Yarabolu | H04L 63/1425 726/4 |
| 2023/0275909 A1* | 8/2023 | Shivamoggi | H04L 63/1433 726/23 |
| 2023/0367833 A1* | 11/2023 | Kol | G06F 9/455 |
| 2023/0370439 A1* | 11/2023 | Crabtree | H04L 63/0428 |
| 2023/0379348 A1* | 11/2023 | Mangarella | H04L 63/1425 |
| 2023/0412620 A1* | 12/2023 | Crabtree | H04L 41/145 |
| 2024/0007491 A1* | 1/2024 | Spurlock | G06F 21/554 |
| 2024/0112065 A1* | 4/2024 | Rezaeian | G06F 18/217 |

\* cited by examiner

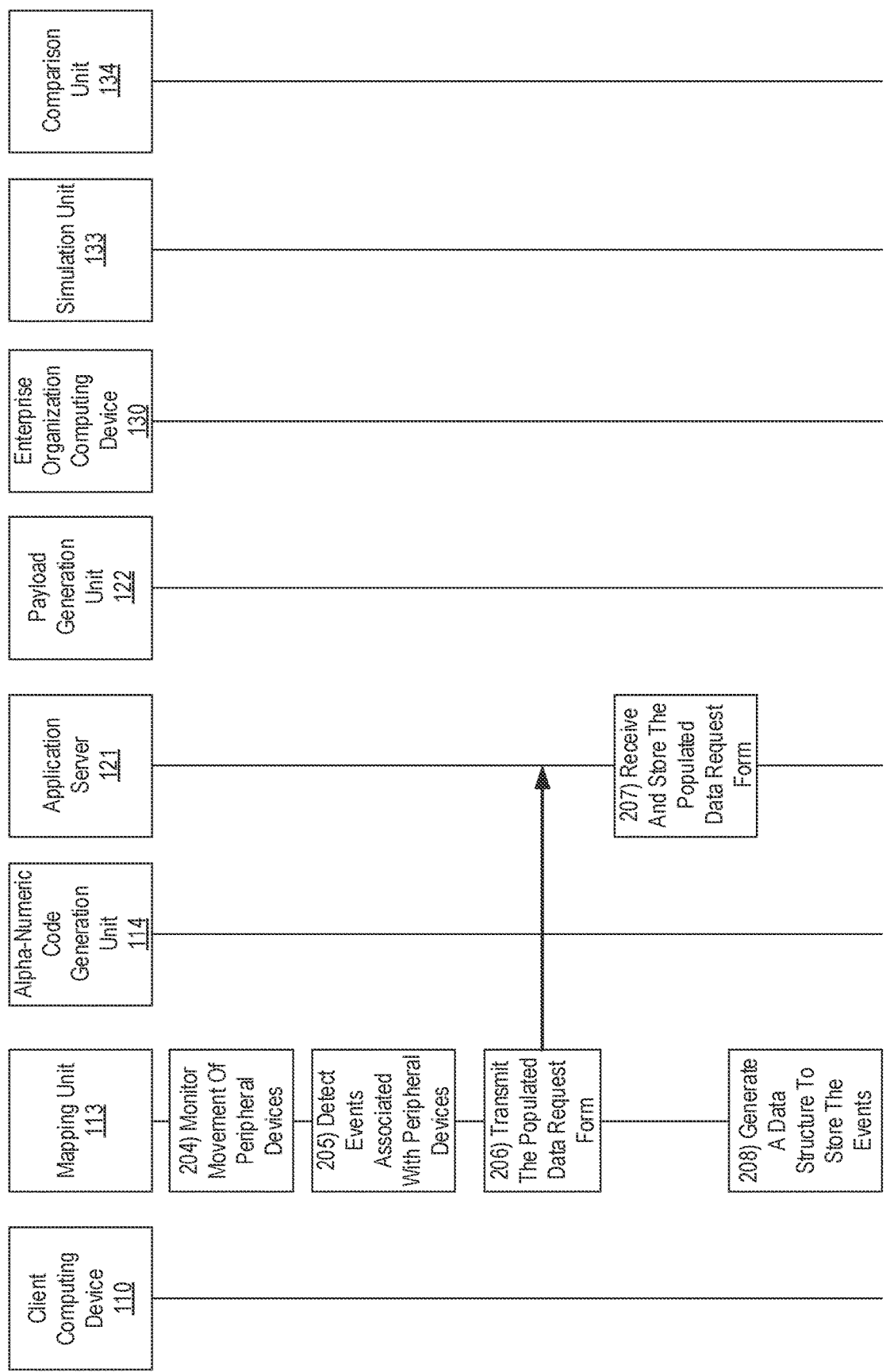

ENTERPRISE ORGANIZATION DATA REQUEST FORM

- First Name
- Last Name
- Email Address
- Phone Number

Data Request Urgency: ◯ High ◯ Moderate ◯ Low

Request:

[SAVE & CONTINUE LATER] [CONTINUE] [SUBMIT]

FIG. 4

| Event | Categorization | Location | Alpha-Numeric Event Code | Alpha-Numeric User Interface Code |
|---|---|---|---|---|
| Clicked on FIRST NAME Data Entry Field | Used mouse to select a data entry field | (30,80) | CLICK0000 | UI_CD_5555 |
| Typed a First Name | Used keyboard to type within the data entry field | (10,80) | TYPE1111 | UI_CD_6666 |
| Scrolled Down the Request Form | Used mouse to scroll through the data request form | (40,80) | SCROLL2222 | UI_CD_7777 |
| Clicked on LAST NAME Data Entry Field | Used mouse to select a data entry field | (90,80) | CLICK3333 | UI_CD_5555 |
| Typed a Last Name | Used keyboard to type within the data entry field | (70,80) | TYPE4444 | UI_CD_6666 |

FIG. 6

DETECTING AND PREVENTING BOTNET ATTACKS USING CLIENT-SPECIFIC EVENT PAYLOADS

BACKGROUND

Aspects of the disclosure relate to hardware and/or software for detecting and preventing botnet attacks using client-specific event payloads. In particular, one or more aspects of the disclosure relate to mapping client-specific events using alpha-numeric event codes and alpha-numeric user interface codes, generating client-specific event payloads and simulated client event payloads using the alpha-numeric event codes and the alpha-numeric user interface codes, and using the client-specific event payloads and the simulated client event payloads to determine the origin of a request to access enterprise organization data.

Current data security protocols for detecting unauthorized data requests transmitted to an enterprise organization are unable to determine whether a data request originates from a legitimate client computing device. The requests to access enterprise organization data may be transmitted to the enterprise organization using either a single client device or a network of light-weight, automatable web services (e.g., a botnet). A legitimate client may be associated with a single client device, and may use only the single client device to generate and transmit a single data request at a time. In doing so, the single client device may generate an event payload which contains data that describes the generation of the data request. However, an unauthorized actor may configure the botnet to generate a plurality of unauthorized data requests and to transmit the plurality of unauthorized data requests to an enterprise server associated with the enterprise organization. The plurality of unauthorized data requests may overload the enterprise server such that the server is unable to process any single data request. The botnet might not generate an event payload since the botnet might not be associated with the devices that are used to generate the event payload (e.g., peripheral devices associated with the client computing device). Therefore, current data security protocols do not offer the enterprise organization the opportunity to determine the origin of the data request using event payloads and to deny unauthorized data requests from unauthorized sources to prevent the unauthorized data requests from overloading the enterprise server.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with detecting and preventing botnet attacks using client-specific event payloads.

In accordance with one or more embodiments, a method may comprise, at a computing device including at least one or more processors and memory, transmitting, from a client computing device and to an application server, a request to access an enterprise organization application. The method may comprise generating, by the client computing device and using a request form, a request to access enterprise organization data. The method may comprise detecting, by the client computing device, a plurality of events. The method may comprise generating, by the client computing device, a plurality of alpha-numeric codes, wherein each alpha-numeric code corresponds to an event of the plurality of events. The method may comprise transmitting, from the client computing device and to the application server, the plurality of alpha-numeric codes. The method may comprise generating, by the application server, a client-specific event payload. The method may comprise transmitting, from the application server and to an enterprise organization, the plurality of alpha-numeric codes. The method may comprise generating, by the enterprise organization, a simulated client event payload. The method may comprise comparing, by the enterprise organization, the client-specific event payload to the simulated client event payload. The method may comprise determining, by the enterprise organization, whether to approve the request based on the comparison.

In accordance with one or more embodiments, a computing platform may comprise a processor, a communication interface communicatively coupled to the processor, and memory storing computer-readable instructions that, when executed by the processor, cause the computing platform to transmit, from a client computing device and to an application server, a request to access an enterprise organization application. The computing platform may generate, by the client computing device and using a request form, a request to access enterprise organization data. The computing platform may detect, by the client computing device, a plurality of events. The computing platform may generate, by the client computing device, a plurality of alpha-numeric codes, wherein each alpha-numeric code corresponds to an event of the plurality of events. The computing platform may transmit, from the client computing device and to the application server, the plurality of alpha-numeric codes. The computing platform may generate, by the application server, a client-specific event payload. The computing platform may transmit, from the application server and to an enterprise organization, the plurality of alpha-numeric codes. The computing platform may generate, by the enterprise organization, a simulated client event payload. The computing platform may compare, by the enterprise organization, the client-specific event payload to the simulated client event payload. The computing platform may determine, by the enterprise organization, whether to approve the request based on the comparison.

In accordance with one or more embodiments, one or more non-transitory computer-readable media storing instructions that, when executed by a computing platform comprising a processor, memory, and a communication interface, cause the computing platform to transmit, from a client computing device and to an application server, a request to access an enterprise organization application. The instructions, when executed, may cause the computing platform to generate, by the client computing device and using a request form, a request to access enterprise organization data. The instructions, when executed, may cause the computing platform to detect, by the client computing device, a plurality of events. The instructions, when executed, may cause the computing platform to generate, by the client computing device, a plurality of alpha-numeric codes, wherein each alpha-numeric code corresponds to an event of the plurality of events. The instructions, when executed, may cause the computing platform to transmit, from the client computing device and to the application server, the plurality of alpha-numeric codes. The instructions, when executed, may cause the computing platform to generate, by the application server, a client-specific event payload. The instructions, when executed, may cause the computing platform to transmit, from the application server and to an enterprise organization, the plurality of alpha-numeric codes. The instructions, when executed, may cause the computing platform to generate, by the enterprise organization, a simulated client event payload. The instructions, when executed, may cause the computing platform to compare, by the enterprise organization, the client-specific event payload to the simulated client event payload. The instructions, when executed, may cause the computing platform to determine, by the enterprise organization, whether to approve the request based on the comparison.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIGS. 2A-2F depict an illustrative event sequence for detecting and preventing botnet attacks using client-specific event payloads in accordance with one or more example embodiments.

FIG. 4 depicts an illustrative data request form for detecting and preventing botnet attacks using client-specific event payloads in accordance with one or more example embodiments.

FIG. 6 depicts an illustrative data structure for detecting and preventing botnet attacks using client-specific event payloads in accordance with one or more example embodiments.

DETAILED DESCRIPTION

Figure 1A:
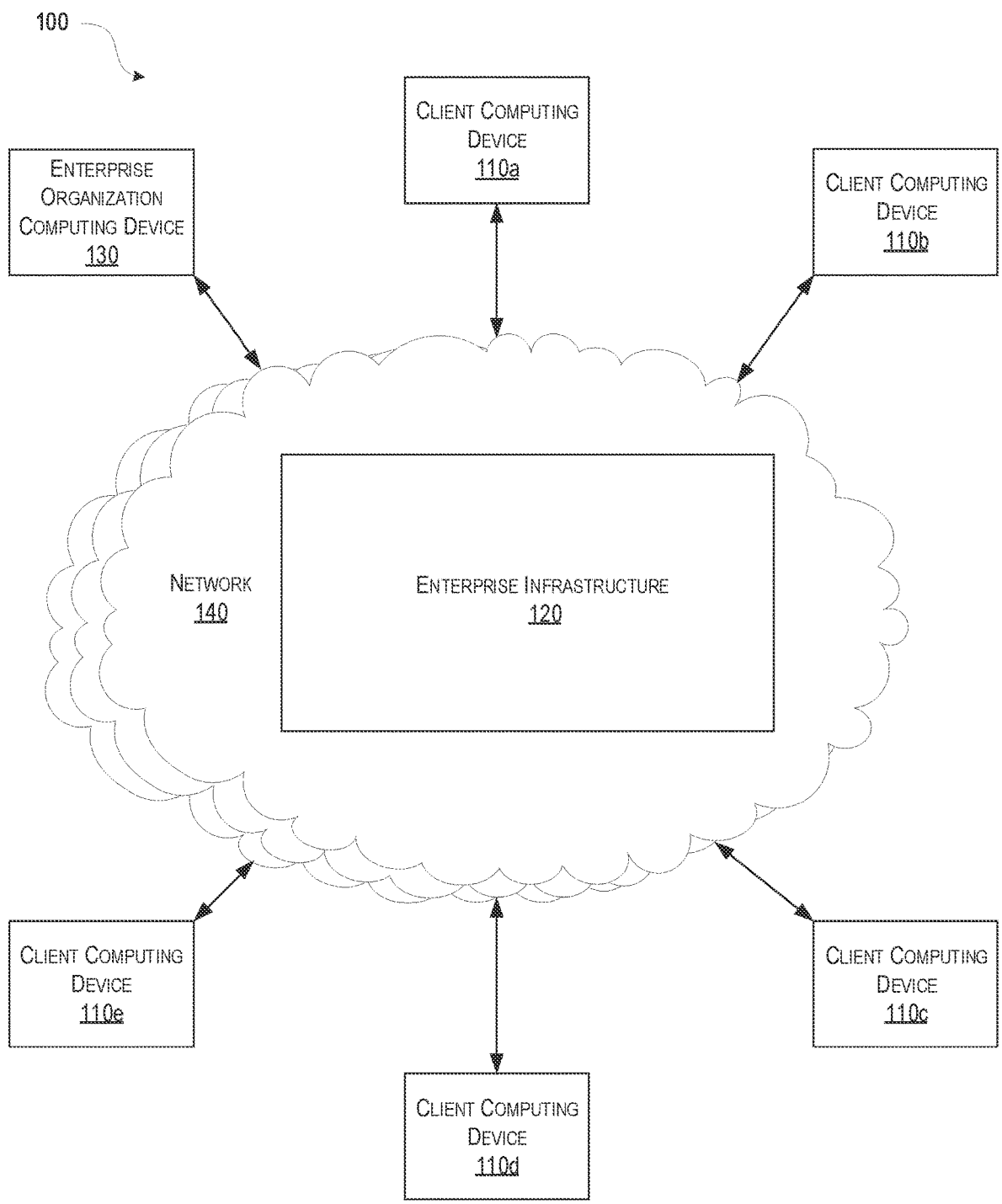
FIG. 1A depicts an illustrative example of a computer system for detecting and preventing botnet attacks using client-specific event payloads in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current data security protocols might not offer an enterprise organization the opportunity to determine, using client-specific event payloads and simulated client event payloads, the origin of a request to access enterprise organization data and to deny unauthorized data requests from unauthorized sources. Accordingly, proposed herein is a solution to the problem described above that includes detecting and preventing botnet attacks using client-specific event payloads. For example, a client computing device may be associated with either a legitimate client user or an unauthorized client user (e.g., either a legitimate single client device or a botnet). The client computing device may be associated with peripheral devices that the user may utilize to generate a request to access enterprise organization data and to transmit the request to an application server. The client computing device may identify the peripheral devices that the user may use to generate the request, and may monitor the peripheral devices that are used. The client computing device may detect events (e.g., movements) associated with each peripheral device that may be used to generate the request. The client computing device may generate an alpha-numeric event code and an alpha-numeric user interface code for each event. The client computing device may transmit a copy of the alpha-numeric event codes and the alpha-numeric user interface codes to an application server. The application server may use the received alpha-numeric event codes and alpha-numeric user interface codes to generate a client-specific event payload, and may store the generated client-specific event payload in a payloads database. The application server may transmit a copy of the alpha-numeric event codes and alpha-numeric user interface codes to the enterprise organization computing device. The enterprise organization computing device may use the received alpha-numeric event codes and alpha-numeric user interface codes to generate a simulated client event payload, and may store the simulated client event payload in the payloads database. The enterprise organization computing device may compare the simulated client event payload to the client-specific event payload, and, based on the comparison, may determine whether the application server should process the request (e.g. determine whether the client computing device that generated the request is associated with a legitimate client user or an unauthorized user).

In some examples, a computing environment may include enterprise infrastructure, an enterprise organization computing device, and a client computing device. The enterprise infrastructure may comprise an application server and a payloads database. The application server within the enterprise infrastructure may comprise a payload generation unit and an alpha-numeric codes database. The enterprise organization computing device may comprise processor(s), memory, communication interface(s), and display device(s). The memory of the enterprise organization computing device may comprise a simulation unit, a comparison unit, and a received alpha-numeric codes database. The client computing device may comprise processor(s), memory, communication interface(s), and display device(s). The memory of the client computing device may comprise a mapping unit, alpha-numeric code generation unit, and a mapped events database.

The client computing device may utilize a plurality of peripheral devices (e.g., a mouse, keyboard, an external hard drive, or the like) to request, from an application server, access to an enterprise organization application. The client computing device may receive, from the enterprise organization computing device, an enterprise organization data request form, which the client computing device may use to request access to enterprise organization data. The client computing device may use the peripheral devices to populate the data request form and may transmit the populated data request form to the application server. The application server may store the populated data request form. The mapping unit of the client computing device may monitor the movement of each peripheral device that is used to populate the request form, and may generate a data structure to store each event (e.g., each detected movement). The mapping unit may categorize each event and determine the location (e.g., on the user interface of the client computing device) of each event. The mapping unit may store the events, the categorization of each event, and the location of each event within the data structure.

The alpha-numeric code generation unit of the client computing device may determine, for each event, an alpha-numeric event code and may store the alpha-numeric event codes in the data structure. Each alpha-numeric event code may describe an event and may comprise a unique identification number. The alpha-numeric code generation unit may determine, for each event, an alpha-numeric user interface code and may store the alpha-numeric user interface codes in the data structure. Each alpha-numeric user interface code may comprise a unique identification number that corresponds to an event such that the payload generation unit and the simulation unit may identify the event based on the alpha-numeric user interface code. The client computing device may store the data structure and may transmit a copy of the data structure to the application server.

The application server may receive, from the client computing device, the copy of the data structure and may store the copy of the data structure. The application server may transmit, to the enterprise organization computing device, the alpha-numeric event codes and the alpha-numeric user interface codes within the data structure. The enterprise organization computing device may receive, from the application server, the alpha-numeric event codes and the alpha-numeric user interface codes, and may store the received codes.

The payload generation unit of the application server may use the alpha-numeric event codes and the alpha-numeric user interface codes in the data structure to generate a client-specific event payload associated with the client computing device. The payload generation unit may store the generated client-specific event payload in a payload database. The client-specific event payload may comprise data transmitted from the client computing device to the application server. The data transmitted from the client computing device to the application server may describe data generated by the client computing device (e.g., the data request, the events, the alpha-numeric event codes, the alpha-numeric user interface codes, the location of the events, or the like). The data generated by the client computing device may be generated using the peripheral devices associated with the client computing device. A client computing device that does not utilize peripheral devices to populate the data request form (e.g., a botnet, an unauthorized user, or the like) might not be associated with a client-specific event payload. For example, a botnet may be configured (e.g., programmed, coded, or the like) to populate the request form to access the enterprise organization data and, as such, might not require peripheral devices. Consequently, the botnet might not generate data that describes the data generated by the client computing device (e.g., the data request, the events, the alpha-numeric codes that correspond to the events, the location of the events, or the like).

The simulation unit of the enterprise organization computing device may retrieve the populated data request form that was generated by the client computing device. The simulation unit may use the received alpha-numeric codes and the data request form to generate a simulated client event payload. The simulation unit may store the simulated client event payload in the payload database. The simulated client event payload may comprise the alpha-numeric event codes and the alpha-numeric user interface codes. The simulation unit may use the alpha-numeric event codes and the alpha-numeric user interface codes to predict the events that the client computing device may have executed (e.g., using the peripheral devices) to populate the request to access to the enterprise organization data. To do so, the simulation unit may identify the data entry fields on the data request form that are populated and may determine a movement, associated with a peripheral device, that may have been necessary to populate the data entry fields. For example, the simulation unit may determine that a data entry field that requests a first name is populated. The simulation unit may determine that a mouse may be needed or expected to click into the data entry field that requests the first name and that a keyboard may be needed or expected to type the first name. The simulation unit may predict that at least one event associated with a mouse (e.g., at least one click event) and at least one event associated with a keyboard (e.g., at least one type event) may be needed or expected to populate the data request form. As such, the simulation unit may generate alpha-numeric event codes and alpha-numeric user interface codes that correspond to the predicted events, and may use the alpha-numeric event codes and alpha-numeric user interface codes to generate the simulated client event payload.

The comparison unit may compare the simulated client event payload to the client-specific event payload to determine the origin of the request to access the enterprise organization data (e.g., whether the request to access the enterprise organization data originated from a single client device, a botnet, or the like). If the simulated client event payload matches the client-specific event payload (e.g., both the simulated client event payload and the client-specific event payload contain identical alpha-numeric event codes and identical alpha-numeric user interface codes, or the like), then the comparison unit may determine that the client computing device is associated with a legitimate client user (e.g., a single user device). The simulated client event payload may match the client-specific event payload when the predicted events indicated in the simulated client event payload match the detected events indicated in the client-specific event payload.

If the client-specific event payload matches the simulated client event payload, then the enterprise organization computing device may instruct, based on the comparison, the application server to process the request to access the enterprise organization data. The application server may transmit, to the client computing device, a notification indicating approval of the request to access the enterprise organization data.

Alternatively, if the simulated client event payload does not match the client-specific event payload (e.g., the alpha-numeric event codes and the alpha-numeric user interface codes within the client-specific event payload and the simulated client event payload do not match, or the like), then the comparison unit may determine that the client computing device is associated with a botnet (e.g., an unauthorized client user). The simulated client event payload might not match the client-specific payload when the predicted events indicated in the simulated client event payload are not indicated in the client-specific event payload. For example, if the simulation unit predicted that at least one click event may be needed or expected to populate a data entry field on the data request form, then the simulated client event payload may indicate at least one click event. However, if the request was generated by a botnet (e.g., a botnet was programmed to generate the request), then the mapping unit might not detect a peripheral device (e.g., a mouse) and the mapping unit might not detect events associated with the peripheral device (e.g., at least one click event).

If the client-specific event payload does not match the simulated client event payload, then the enterprise organization computing device may instruct, based on the comparison, the application server to deny the request to access the enterprise organization data. The application server may transmit, to the client computing device, a notification indicating denial of the request to access the enterprise organization data.

Computer Architecture

FIG. 1A depicts an illustrative example of a computer system 100 for detecting and preventing botnet attacks using client-specific event payloads in accordance with the features described herein. Computer system 100 may comprise client computing devices 110a-110e, enterprise infrastructure 120, and enterprise organization computing device 130. While FIG. 1A depicts more than one client computing device (e.g. client computing devices 110a-110e), each of client computing devices 110a-110e may be configured in accordance with the features described herein. While the description herein may refer to client computing device 110, it is important to note that the functions described in connection with client computing device 110 may also be performed by any one of client computing devices 110a-110e. Each one of client computing devices 110a-110e and enterprise organization computing device 130 may be configured to communicate with enterprise infrastructure 120 through network 140. In some arrangements, computer system 100 may include additional computing devices that are not depicted in FIG. 1A, which may also be configured to interact with enterprise infrastructure 120 and, in some instances, client computing device 110.

As discussed in detail in connection with FIG. 1B, client computing device 110 may comprise processor(s) 111, memory 112, communication interface(s) 117, and display device(s) 118. Memory 112 of client computing device 110 may comprise mapping unit 113, alpha-numeric code generation unit 114, and mapped events database 115. Client computing device 110 may be configured to communicate with peripheral devices 116a-116f (e.g., a mouse, a keyboard, a printer, a hard disk, or the like). While the description herein may refer to peripheral device 116, it is important to note that the functions described in connection with peripheral device 116 may also be performed by any one of peripheral devices 116a-116f. Each one of peripheral devices 116a-116f may be configured to communicate with client computing device 110 through network 140.

As discussed in detail in connection with FIG. 1C, enterprise infrastructure 120 may comprise application server 121, payloads database 124, database 125, and processor(s) 126. Application server 121 may comprise payload generation unit 122 and alpha-numeric codes database 123. Each computing device within enterprise infrastructure 120 may contain database 125 and processor(s) 126, which may be stored in the memory of the one or more computing device(s) of enterprise infrastructure 120. Enterprise infrastructure 120 may be associated with a distinct entity such as an enterprise organization, company, school, government, or the like, and may comprise one or more personal computer(s), server computer(s), hand-held or laptop device(s), multiprocessor system(s), microprocessor-based system(s), set top box(es), programmable client electronic device(s), network personal computer(s) (PC), minicomputer(s), mainframe computer(s), distributed computing environment(s), or the like. Enterprise infrastructure 120 may include computing hardware and/or software that may host various data and applications for performing tasks of the centralized entity and interacting with client computing device 110, as well as other computing devices.

In some arrangements, enterprise infrastructure 120 may include and/or be part of enterprise information technology infrastructure and may host a plurality of enterprise applications, enterprise databases, and/or other enterprise resources. Such applications may be executed on one or more computing devices included in enterprise infrastructure 120 using distributed computing technology or the like. In some instances, enterprise infrastructure 120 may include a relatively large number of servers that may support operations of the enterprise organization, such as a financial institution.

As discussed in detail in connection with FIG. 1D, enterprise organization computing device 130 may comprise processor(s) 131, memory 132, communication interface(s) 136, and display device(s) 137. Memory 132 of enterprise organization computing device 130 may comprise simulation unit 133, comparison unit 134, and received alpha-numeric codes database 135.

Figure 1B:
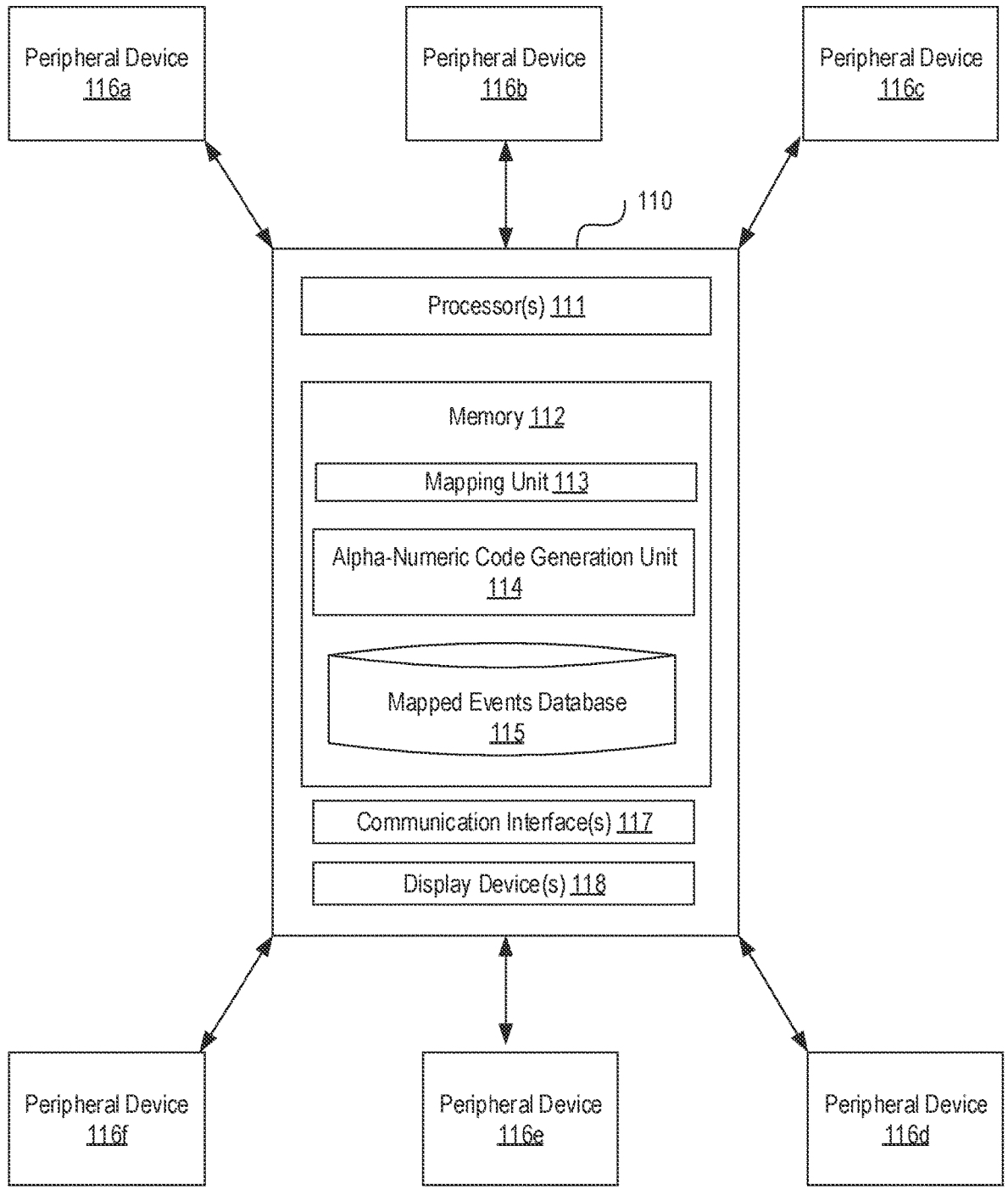
FIG. 1B depicts an illustrative example of the client computing device and the peripheral devices for detecting and preventing botnet attacks using client-specific event payloads in accordance with one or more example embodiments.

FIG. 1B depicts an illustrative example of client computing device 110 and peripheral devices 116 for detecting and preventing botnet attacks using client-specific event payloads in accordance with the features described herein. Client computing device 110 may comprise processor(s) 111, memory 112, communication interface(s) 117, and display device(s) 118. A data bus processor may interconnect processor(s) 111, memory 112, communication interface(s) 117, and display device(s) 118. Communication interface(s) 117 may be a network interface configured to support communication between client computing device 110 and network 140. Memory 112 may include one or more program units having instructions that, when executed by processor(s) 111, may cause client computing device 110 to perform one or more functions described herein and/or may cause one or more databases to store and/or otherwise maintain information which may be used by such program units and/or processor(s) 111. In some instances, the one or more program units and/or databases may be stored and/or maintained in different memory units of client computing device 110 and/or by different computing devices that may form and/or otherwise make up client computing device 110. For example, memory 112 may have, store, and/or include mapping unit 113, alpha-numeric code generation unit 114, and mapped events database 115, each of which are described in detail below. As illustrated in FIG. 1B, client computing device 110 may use (e.g., connect to, communicate with, or the like) peripheral devices 116, as described in detail below.

Client computing device 110 may transmit, to application server 121, a request to access an enterprise organization application (e.g., an enterprise organization request submission portal, an Internet website associated with the enterprise organization, or the like). Client computing device 110 may receive, from application server 121, an enterprise organization data request form. Client computing device 110 may display, via display device(s) 118, the received data request form. Client computing device 110 may use peripheral devices 116 (e.g., a mouse, a keyboard, a printer, an external drive, a hard disk, or the like) to navigate the data request form (e.g., scroll through the data request form, select a data entry field, click within a data entry field, highlight a data entry field, advance to a next page of data request form, return to a previous page of the data request form, or the like). Client computing device 110 may populate the data request form using peripheral devices 116 (e.g., select an option within a drop-down menu associated with a data entry field, highlight a radio button associated with a data entry field, type a response into a data entry field, or the like).

Mapping unit 113 may detect events (e.g., the movement of peripheral devices 116), categorize each event, and determine the location of each event. Alpha-numeric code generation unit 114 may generate alpha-numeric event codes and alpha-numeric user interface codes for each event. Mapping unit 113 may generate a data structure to store the events, the categorization of each event, the location of each event, the alpha-numeric codes, or the like. Alpha-numeric code generation unit 114 may store a copy of the data structure in mapped events database 115. Access to mapped events database 115 may differ depending on the computing device requesting access (e.g., a hierarchy of accessibility). Alpha-numeric code generation unit 114 may be associated with a first level of accessibility (e.g., a least restrictive level of accessibility). Alpha-numeric code generation unit 114 may perform functions on the data within mapped events database 115 (e.g., access the data structures, add new data structures, remove data structures, modify data structures, or the like). Mapping unit 113 may be associated with a second level of accessibility (e.g., a more restrictive level of accessibility than the first level of accessibility). Mapping unit 113 may view the data structures within mapped events database 115, but might not be permitted to add, remove, or modify the data structures within mapped events database 115.

Client computing device 110 may transmit a copy of the data structure to application server 121. Client computing device 110 may receive, from application server 121, a notification indicating one of approval or denial of the request to access the enterprise organization data.

Mapping unit 113 of client computing device 110 may monitor the movement of peripheral devices 116. To do so, mapping unit 113 may identify peripheral devices 116 that are associated with client computing device 110 and may determine whether client computing device 110 interacts with peripheral devices 116 (e.g., whether client computing device 110 clicks a button on a mouse, uses the mouse to scroll through the data request form, uses a keyboard to populate a data entry field, uses the mouse to select a radio button, or the like). Mapping unit 113 may determine that client computing device 110 interacts with peripheral devices 116 and may detect the movement of peripheral devices 116. Each detected movement of peripheral devices 116 may be an event (e.g., clicking, scrolling, pressing a key, or the like may each be an event). Mapping unit 113 may generate a data structure (e.g., a two-dimensional data structure such as a table, or the like) to store the events. Mapping unit 113 may categorize each event stored within the data structure. To categorize each event, mapping unit 113 may describe the way in which client computing device 110 interacts with peripheral devices 116 (e.g., uses a mouse to navigate to a data entry field that requests a first name, uses a mouse to select the data entry field that requests the first name, uses a keyboard to type in the first name, uses the mouse to scroll to the bottom of the data request form, uses the mouse to submit the data request form, or the like).

Mapping unit 113 may determine the location of each event. To determine the location of each event, mapping unit 113 may superimpose a coordinate system (e.g., a Cartesian coordinate system) onto the data request form. The coordinate system might not be visible on display device 118 of client computing device 110, but may be visible to mapping unit 113 as mapping unit 113 monitors peripheral devices 116. Mapping unit 113 may use the coordinate system to identify the location(s) where client computing device 110 interacts with peripheral devices 116 (e.g., an X-coordinate and a Y-coordinate that indicate the location of a data entry field that requests a first name, an X-coordinate and a Y-coordinate that indicate the location of the mouse click within the data entry field that requests the first name, an X-coordinate and a Y-coordinate that indicate the location within the data entry field where the first name is entered, or the like). Mapping unit 113 may store, within the data structure, the events, the categorization of events, and the coordinates (e.g., Cartesian coordinates) of each event.

Alpha-numeric code generation unit 114 may use the data within the data structure to generate an alpha-numeric event code for each event in the data structure. Each alpha-numeric event code may describe an event (e.g., "click," "scroll," "type," or the like) and may comprise a unique identification number. Each combination of the description and the unique identification number may correspond to a single event. Alpha-numeric code generation unit 114 may store the alpha-numeric event codes within the data structure. Alpha-numeric code generation unit 114 may further use the data within the data structure to generate an alpha-numeric user interface code for each event in the data structure. Each alpha-numeric user interface code may comprise a unique identification number that corresponds to an event such that the event may be identified based on the alpha-numeric user interface code (e.g., a first alpha-numeric user interface code may identify clicking events, a second alpha-numeric user interface code may identify typing events, or the like). Alpha-numeric code generation unit 114 may store the alpha-numeric user interface codes within the data structure. Alpha-numeric code generation unit 114 may store the data structure within mapped events database 115.

Figure 1D:
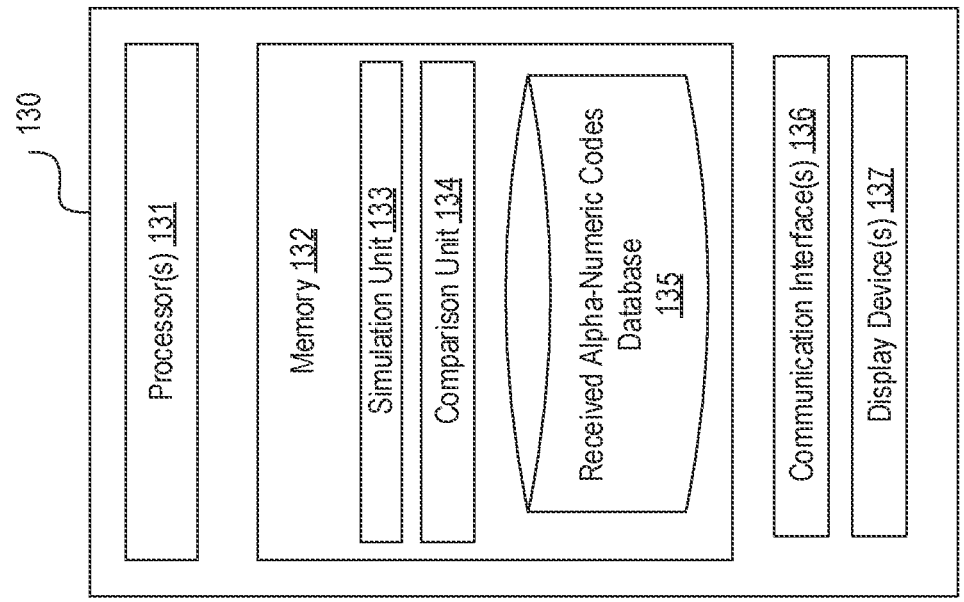
FIG. 1D depicts an illustrative example of the enterprise organization computing device for detecting and preventing botnet attacks using client-specific event payloads in accordance with one or more example embodiments.
Figure 1C:
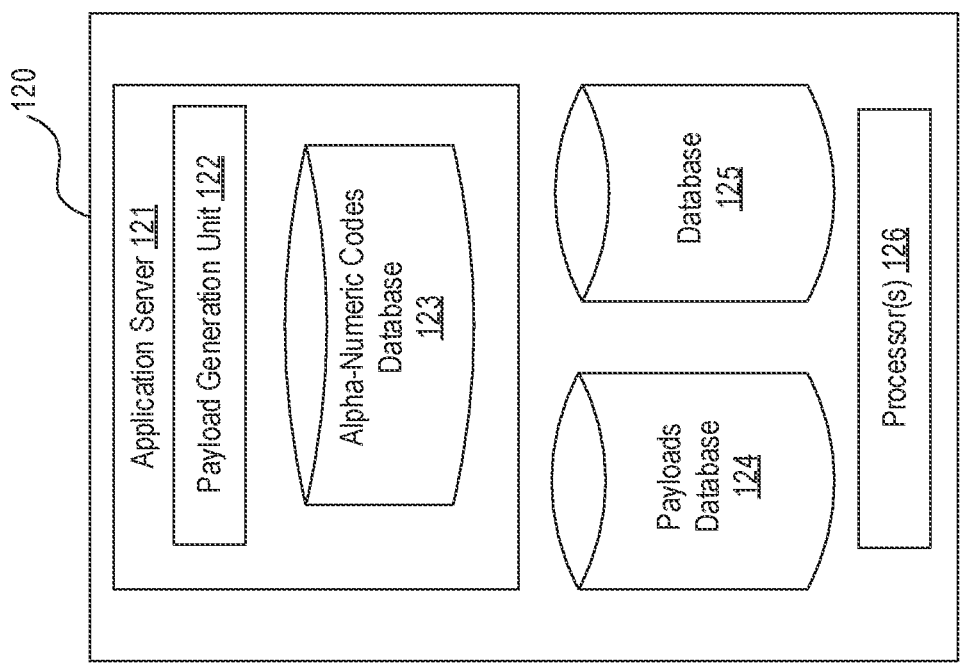
FIG. 1C depicts an illustrative example of the enterprise infrastructure for detecting and preventing botnet attacks using client-specific event payloads in accordance with one or more example embodiments.

FIG. 1C depicts an illustrative example of enterprise infrastructure 120 for detecting and preventing botnet attacks using client-specific event payloads in accordance with the features described herein. Enterprise infrastructure 120 may comprise application server 121, payloads database 124, database 125, and processor(s) 126. A data bus processor may interconnect application server 121, payloads database 124, database 125, and processor(s) 126. One or more program units having instructions that, when executed by processor(s) 126, may cause enterprise infrastructure 120 to perform one or more functions described herein and/or may cause one or more databases (e.g., payloads database 124, database 125, or the like) to store and/or otherwise maintain information which may be used by such program units and/or processor(s) 126.

Application server 121 may receive, from client computing device 110, a request to access the enterprise organization request submission application. Application server 121 may permit client computing device 110 to access the enterprise organization application. Application server 121 may transmit, to client computing device 110, an enterprise organization data request form and may receive, from client computing device 110, a populated data request form. Application server 121 may store the populated data request form in database 125. Access to database 125 may differ depending on the computing device requesting access (e.g., a hierarchy of accessibility). Application server 121 may be associated with a first level of accessibility (e.g., a least restrictive level of accessibility). Application server 121 may perform functions on the data within database 125 (e.g., access the data request forms, add new data request forms, remove data request forms, or the like). Simulation unit 133 may be associated with a second level of accessibility (e.g., a more restrictive level of accessibility than the first level of accessibility). As such, simulation unit 133 may view the data request forms within database 125, but might not be permitted to add, remove, or modify the data request forms within database 125.

Application server 121 may receive, from client computing device 110, a copy of the data structure that contains the alpha-numeric event codes and the alpha-numeric user interface codes. Application server 121 may store the copy of the data structure in alpha-numeric codes database 123. Application server 121 may be associated with the least restrictive level of access to alpha-numeric codes database 123 and, as such, may perform functions on the data within alpha-numeric codes database 123 (e.g., access the data structures, add data structures, remove data structures, or the like).

Application server 121 may transmit, to enterprise organization computing device 130, the alpha-numeric event codes and the alpha-numeric user interface codes. Application server 121 may receive, from enterprise organization computing device 130, instructions to process the request to access the enterprise organization data based on a simulated client event payload matching a client-specific event payload. Application server 121 may transmit, to client computing device 110, a notification indicating approval of the request to access the enterprise organization data.

Alternatively, application server 121 may receive, from enterprise organization computing device 130, instructions to deny the request to access the enterprise organization data based on the simulated client event payload failing to match the client-specific event payload. Application server 121 may transmit, to client computing device 110, a notification indicating denial of the request to access the enterprise organization data.

Payload generation unit 122 of enterprise infrastructure 120 may use the data within the data structure (e.g., the events, the alpha-numeric event codes, the alpha-numeric user interface codes, the location of the events, the categorization of the events, or the like) to generate a client-specific event payload. The data within the data structure may be generated using peripheral devices 116 associated with client computing device 110. If client computing device 110 does not utilize peripheral devices 116 to populate the request form to access the enterprise organization data, then client computing device 110 might not be associated with a client-specific event payload. For example, a botnet may be configured (e.g., programmed, coded, or the like) to populate the request form to access the enterprise organization data and, as such, might not require peripheral devices 116. Consequently, without peripheral devices 116, the botnet might not generate data that describes the data generated by client computing device 110 (e.g., the data request, the events, the alpha-numeric event codes, the alpha-numeric user interface codes, the location of the events, the categorizations of the events, or the like).

Payload generation unit 122 may store the client-specific event payload within payloads database 124. Access to payloads database 124 may differ depending on the computing device requesting access (e.g., a hierarchy of accessibility). Payload generation unit 122 of application server 121 and simulation unit 133 of enterprise organization computing device 130 may be associated with a first level of accessibility (e.g., the least restrictive level of accessibility). As such, payload generation unit 122 and simulation unit 133 may perform functions on the data within payloads database 124 (e.g., access client-specific event payloads and simulated client event payloads, add client-specific event payloads and simulated client event payloads, remove client-specific event payloads and simulated client event payloads, modify client-specific event payloads and simulated client event payloads, or the like). Comparison unit 134 may be associated with a second level of accessibility (e.g., a more restrictive level of accessibility than the first level of accessibility). Comparison unit 134 may view the data within payloads database 124, but might not be permitted to add, remove, or modify the data within payloads database 124.

FIG. 1D depicts an illustrative example of enterprise organization computing device 130 for detecting and preventing botnet attacks using client-specific event payloads in accordance with the features described herein. Enterprise organization computing device 130 may comprise processor(s) 131, memory 132, communication interface(s) 136, and display device(s) 137. A data bus processor may interconnect processor(s) 131, memory 132, communication interface(s) 136, and display device(s) 137. Communication interface(s) 136 may be a network interface configured to support communication between enterprise organization computing device 130 and network 140. Memory 132 may include one or more program units having instructions that, when executed by processor(s) 131, may cause enterprise organization computing device 130 to perform one or more functions described herein and/or may cause one or more databases to store and/or otherwise maintain information which may be used by such program units and/or processor(s) 131. In some instances, the one or more program units and/or databases may be stored and/or maintained in different memory units of enterprise organization computing device 130 and/or by different computing devices that may form and/or otherwise make up enterprise organization computing device 130. For example, memory 132 may have, store, and/or include simulation unit 133, comparison unit 134, and received alpha-numeric codes database 135, each of which are described in detail below.

Enterprise organization computing device 130 may receive, from application server 121, the alpha-numeric event codes and the alpha-numeric user interface codes. Enterprise organization computing device 130 may store the alpha-numeric event codes and the alpha-numeric user interface codes in received alpha-numeric codes database 135. Enterprise organization computing device 130 may be associated with the least restrictive level of access to received alpha-numeric codes database 135 and, as such, may perform functions on the data within received alpha-numeric codes database 135 (e.g., access the alpha-numeric codes, add alpha-numeric codes, remove alpha-numeric codes, or the like). Enterprise organization computing device 130 may transmit, to application server 121 and based on comparison unit 134 determining that the client-specific event payload and the simulated client event payload match, instructions to process the request to access the enterprise organization data. Alternatively, enterprise organization computing device 130 may transmit, to application server 121 and based on comparison unit 134 determining that the client-specific event payload and the simulated client event payload do not match, instructions to deny the request to access the enterprise organization data.

Simulation unit 133 of enterprise organization computing device 130 may retrieve, from database 125 of enterprise infrastructure 120, the populated data request form. Simulation unit 133 may use the alpha-numeric event codes, the alpha-numeric user interface codes, and the populated data request form to generate a simulated client event payload. Simulation unit 133 may use the alpha-numeric event codes and the alpha-numeric user interface codes to predict the events (e.g., movements associated with peripheral devices 116) that client computing device 110 may have executed while populating the request to access to the enterprise organization data. To do so, simulation unit 133 may identify the data entry fields on the data request form that are populated and may determine a movement associated with a peripheral device that may have been necessary to populate the data entry fields. For example, simulation unit 133 may determine that a data entry field is populated. Simulation unit 133 may determine that a mouse may be needed or expected to click into the data entry field and that a keyboard may be needed or expected to populate the data entry field. Simulation unit 133 may predict that at least one event associated with a mouse (e.g., at least one click event) and at least one event associated with a keyboard (e.g., at least one type event) may be needed or expected to populate the data request form. As such, simulation unit 133 may generate alpha-numeric event codes and alpha-numeric user interface codes that correspond to the predicted events, and may use the alpha-numeric event codes and alpha-numeric user interface codes to generate the simulated client event payload.

The simulated client event payload might not specifically indicate each event (e.g., might not indicate that client computing device 110 "clicked on the FIRST NAME data entry field" at a location corresponding to Cartesian coordinates (30,80), or the like), but may indicate the nature of each event (e.g., alpha-numeric user interface code "UI_CD_5555" may indicate that client computing device clicked a mouse at least one time, alpha-numeric user interface code "UI_CD_7777" may indicate that client computing device scrolled through the data request form at least one time, or the like). The simulated client event payload may be associated with a legitimate client user (e.g., a single user device) and, as such, may contain alpha-numeric event codes and alpha-numeric user interface codes that correspond to the events detected by mapping unit 113. Alternatively, the simulated client event payload may be associated with an unauthorized client user (e.g., a botnet) and, as such, might not contain alpha-numeric event codes and alpha-numeric user interface codes that correspond to the events detected by mapping unit 113 since the botnet may be programmed to populate the request to access the enterprise organization data and might not use peripheral devices 116 to populate the request. In such instances, the simulated client event payload may comprise alpha-numeric event codes and alpha-numeric user interface codes that predict the events that may be necessary to populate the data request form.

Simulation unit 133 may store the simulated client event payload within payloads database 124. As described above, simulation unit 133 may be associated with a first level of accessibility to payloads database 124 (e.g., the least restrictive level of accessibility). As such, simulation unit 133 may perform functions on the data within payloads database 124 (e.g., access simulated client event payloads, add simulated client event payloads, remove simulated client event payloads, modify simulated client event payloads, or the like).

Comparison unit 134 of enterprise organization computing device 130 may compare the simulated client event payload to the client-specific event payload to determine the origin of the request to access the enterprise organization data (e.g., whether the request to access the enterprise organization data originated from a single user device, a botnet, or the like). To do so, comparison unit 134 may retrieve, from payloads database 124, both the client-specific event payload and the simulated client event payload. As described above, comparison unit 134 may be associated with a second level of accessibility to payloads database 124 (e.g., a more restrictive level of accessibility than the first level of accessibility). Comparison unit 134 may view the data within payloads database 124, but might not be permitted to add, remove, or modify the data within payloads database 124.

Comparison unit 134 may determine whether the alpha-numeric event codes and alpha-numeric user interface codes within the client-specific event payload match the alpha-numeric event codes and the alpha-numeric user interface codes within the simulated client event payload. In particular, comparison unit 134 may determine whether the predicted events (e.g., expected movement of a peripheral device) within the simulated client event payload match the detected events (e.g., actual movement of peripheral device, if any) within the client-specific event payload.

If the simulated client event payload and the client-specific event payload match (e.g., both the simulated client event payload and the client-specific event payload contain identical alpha-numeric event codes and identical alpha-numeric user interface codes, or the like), then comparison unit 134 may determine that client computing device 110 is associated with a legitimate client user (e.g., single user device). Comparison unit 134 may determine that the predicted events in the simulated client event payload match the detected events in the client-specific event payload. If comparison unit 134 determines that client computing device 110 is associated with a legitimate client user (e.g., a single user device), then comparison unit 134 may determine that the request to access the enterprise organization data should be processed.

Alternatively, if the simulated client event payload and the client-specific event payload do not match (e.g., the alpha-numeric event codes and the alpha-numeric user interface codes within the client-specific event payload and the simulated client event payload do not match, or the like), then comparison unit 134 may determine that client computing device 110 is associated with an unauthorized client user (e.g., a botnet). Comparison unit 134 may determine that the predicted events in the simulated client event payload do not match the detected events in the client-specific event payload. If comparison unit 134 determines that client computing device 110 is associated with an unauthorized user (e.g., a botnet), then comparison unit 134 may determine that the request to access the enterprise organization data should be denied.

As stated above, computer system 100 also may include one or more networks, which may interconnect one or more of client computing device 110, enterprise infrastructure 120, and enterprise organization computing device 130. For example, computer system 100 may include network 140. Network 140 may include one or more sub-networks (e.g., local area networks (LANs), wide area networks (WANs), or the like). Furthermore, computer system 100 may include a local network configured to interconnect each of the computing devices comprising enterprise infrastructure 120.

Detecting and Preventing Botnet Attacks Using Client-Specific Event Payloads

FIGS. 2A-2F depict an illustrative event sequence for detecting and preventing, in real-time or near real-time, botnet attacks using client-specific event payloads in accordance with one or more aspects described herein. While aspects described with respect to FIG. 2A to FIG. 6 include the evaluation of a single request to access enterprise organization data, a plurality of requests may be received and evaluated (e.g., in parallel) without departing from the present disclosure.

Figure 2A:
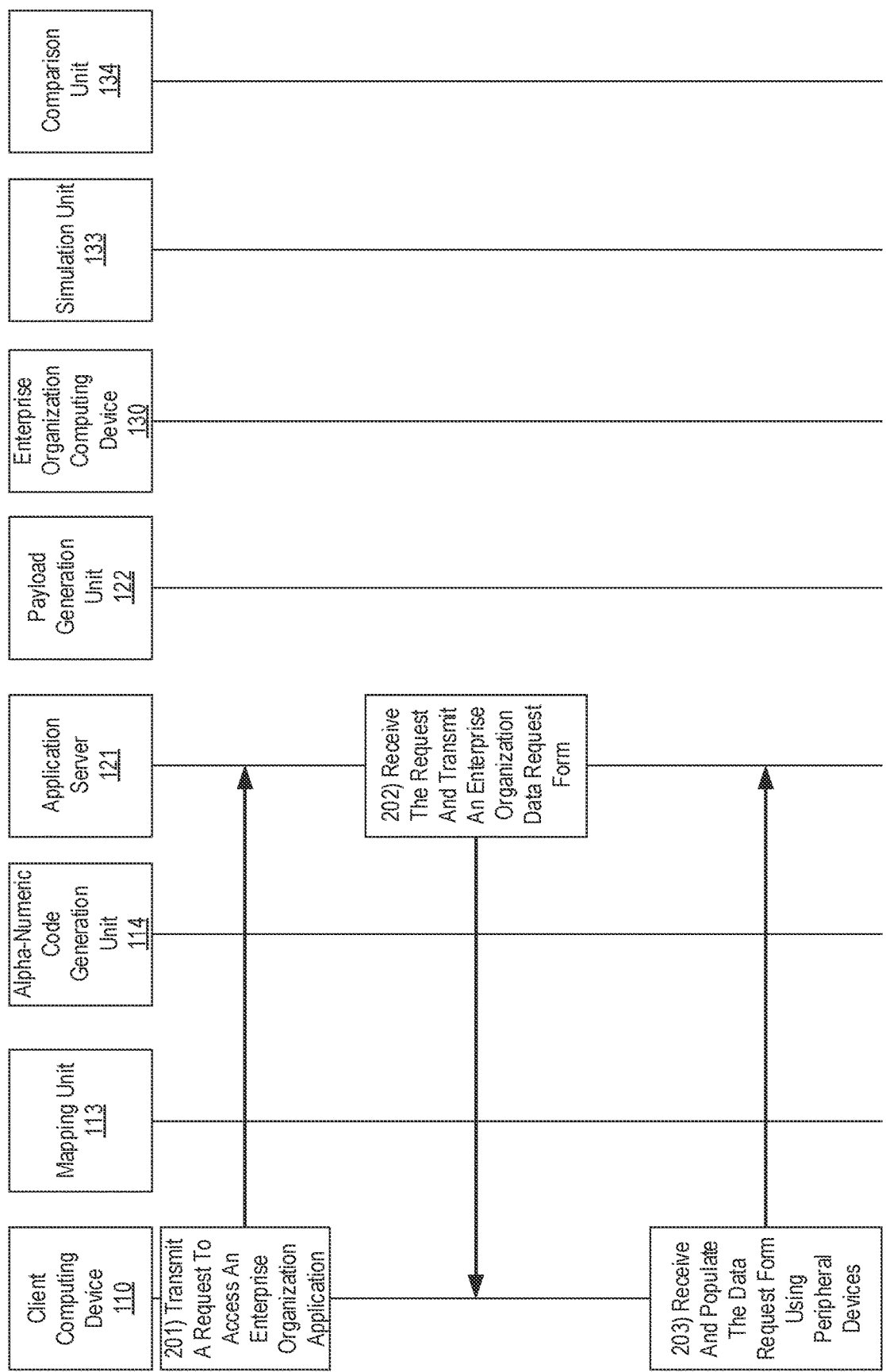

Referring to FIG. 2A, at step 201, client computing device 110 may transmit, to application server 121, a request to access an enterprise organization application (e.g., an enterprise organization request submission portal, an Internet website associated with the enterprise organization, or the like). Client computing device 110 may transmit the request across network 140 and using communication interface(s) 117.

At step 202, application server 121 may receive, from client computing device 110, the request to access the enterprise organization application (e.g., the enterprise organization request submission portal). Application server 121 may allow client computing device 110 to access the enterprise organization application such that client computing device 110 may interact with the enterprise organization application. In particular, application server 121 may transmit, to communication interface(s) 117 of client computing device 110 and across network 140, an enterprise organization data request form.

Client computing device 110 may use the data request form to submit a request to access data within the enterprise organization. The data request form may request information from client computing device 110. FIG. 4 depicts an illustrative example of a data request form. As illustrated in FIG. 4, the data request form may comprise data entry fields, radio button selections, or the like. For example, the request form may request a first name, a last name, an email address, a phone number, an urgency level of the data request, and the data request.

At step 203, client computing device 110 may receive, from application server 121, the data request form. The data request form may be displayed using display device(s) 118 of client computing device 110, and client computing device 110 may populate the data request form using display device(s) 118 and peripheral devices 116. Client computing device 110 may use peripheral devices 116 (e.g., a mouse, a keyboard, a printer, an external drive, a hard disk, or the like) to navigate the data request form (e.g., scroll through the data request form, select a data entry field, click within a data entry field, highlight a data entry field, advance to the next page of data request form, return to a previous page of the data request form, or the like). Client computing device 110 may populate the data request form using peripheral devices 116 (e.g., select an option within a drop-down menu associated with a data entry field, highlight a radio button associated with a data entry field, type a response within a data entry field, or the like).

Using the sample data request form in FIG. 4 as an example, client computing device 110 may use a mouse to click on the data entry field that requests a first name. Client computing device 110 may use a keyboard to type a first name into the data entry field that requests the first name. Client computing device 110 may scroll down the data request form and may use the mouse to select a radio button that indicates the appropriate urgency level of the request to access the enterprise organization data. Client computing device 110 may use the mouse to scroll further down the data request form and to click on the data entry field that requests a written description of the request to access the enterprise organization data. Client computing device 110 may use the mouse to scroll further down the data request form and may use the mouse to select a next action (e.g., "SAVE & CONTINUE LATER," "CONTINUE," "SUBMIT," or the like).

Referring to FIG. 2B, at step 204, mapping unit 113 of client computing device 110 may monitor the movement of peripheral devices 116. To do so, mapping unit 113 may identify peripheral devices 116 that are associated with client computing device 110 and may determine whether client computing device 110 interacts with peripheral devices 116 (e.g., whether client computing device 110 clicks a button on a mouse, uses the mouse to scroll through the data request form, uses a keyboard to populate a data entry field, uses the mouse to select a radio button, or the like). For example, mapping unit 113 may determine that client computing device 110 uses a mouse and a keyboard. As such, mapping unit 113 may monitor the way in which client computing device 110 interacts with the mouse and the keyboard to determine whether client computing device 110 uses the mouse and the keyboard to populate the data request form.

At step 205, mapping unit 113 may determine that client computing device 110 interacts with peripheral devices 116 and may detect the movement of peripheral devices 116. Each detected movement of peripheral devices 116 may be an event (e.g., a mouse click, scroll, key press, or the like may each be an event). Using the sample data request form in FIG. 4 as an example, mapping unit 113 may determine that client computing device 110 uses a mouse to click into the FIRST NAME data entry field, to scroll to down to the PHONE NUMBER data entry field, and to click into the PHONE NUMBER data entry field. Mapping unit 113 may further determine that client computing device 110 uses a keyboard to type within the FIRST NAME and PHONE NUMBER data entry fields. Mapping unit 113 may determine that each click into a data entry field is an event, that pressing keys on the keyboard is an event (e.g., each key that is pressed is an event), that each scroll to a different location on the data request form is an event, or the like.

At step 206, mapping unit 113 may transmit, across network 140 and using communication interface(s) 117 of client computing device 110, the populated data request form to application server 121. At step 207, application server 121 may receive, from communication interface(s)

117 of client computing device 110 and across network 140, the populated data request form. Application server 121 may store the populated data request form in database 125.

At step 208, mapping unit 113 may generate a data structure (e.g., a two-dimensional data structure such as a table, or the like) to store the events detected in step 205. FIG. 6 depicts a sample data structure associated with a single client user device (e.g., a legitimate client user) that mapping unit 113 may generate to store the detected events. As illustrated in FIG. 6, mapping unit 113 may generate a table. Within the table, mapping unit 113 store each detected event (e.g., "Clicked on FIRST NAME Data Entry Field," "Typed a First Name," "Scrolled Down the Data Request Form," "Clicked on LAST NAME Data Entry Field," "Typed a Last Name," or the like).

Figure 2C:
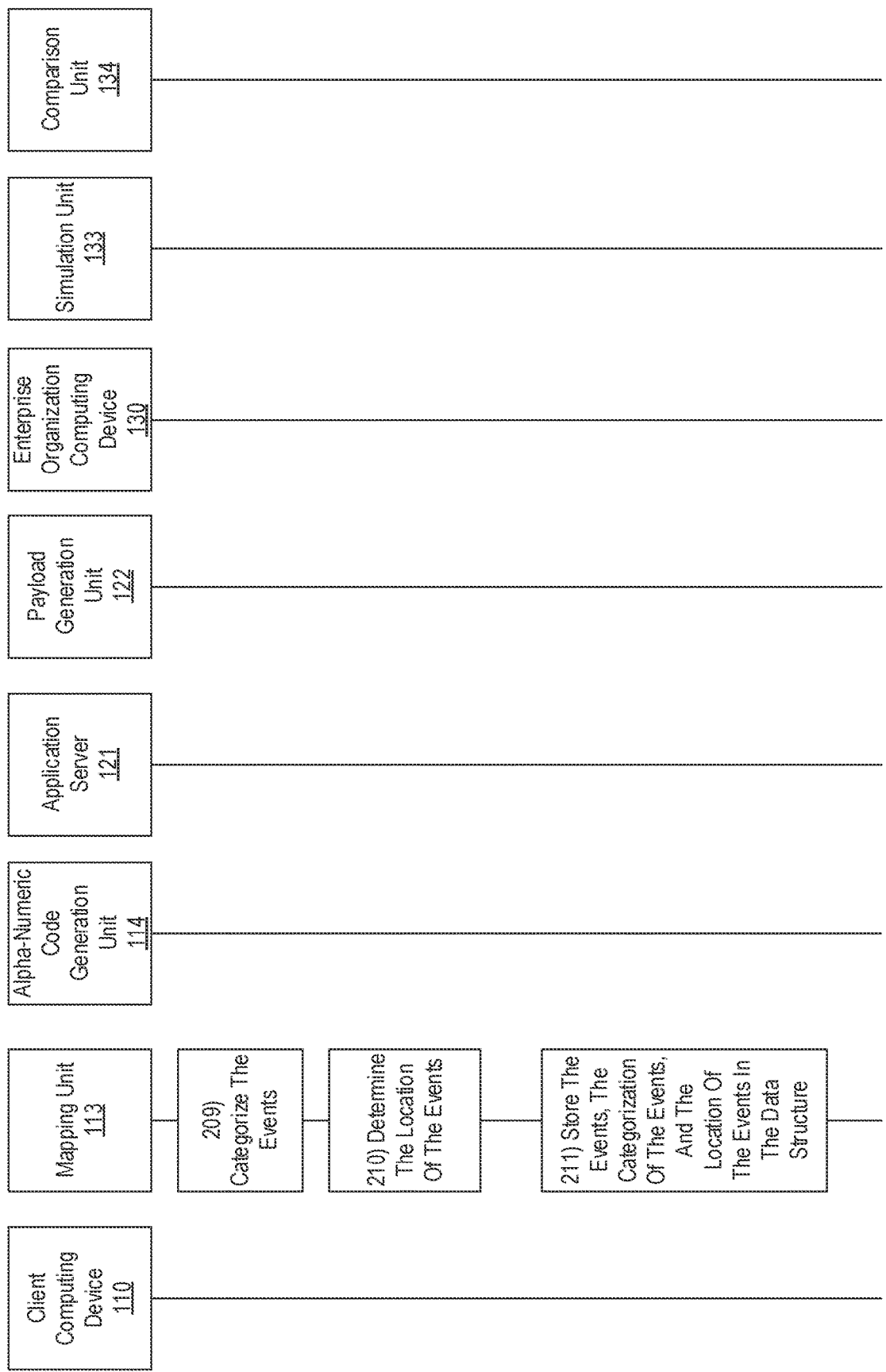

Referring to FIG. 2C, at step 209, mapping unit 113 may categorize each event stored within the data structure. To categorize each event, mapping unit 113 may describe how client computing device 110 interacts with peripheral devices 116 (e.g., uses a mouse to navigate to a data entry field that requests a first name, uses the mouse to select the data entry field that requests the first name, uses a keyboard to type within the data entry field, uses the mouse to scroll to the bottom of the data request form, uses the mouse to submit the data request form, or the like).

Figure 5:
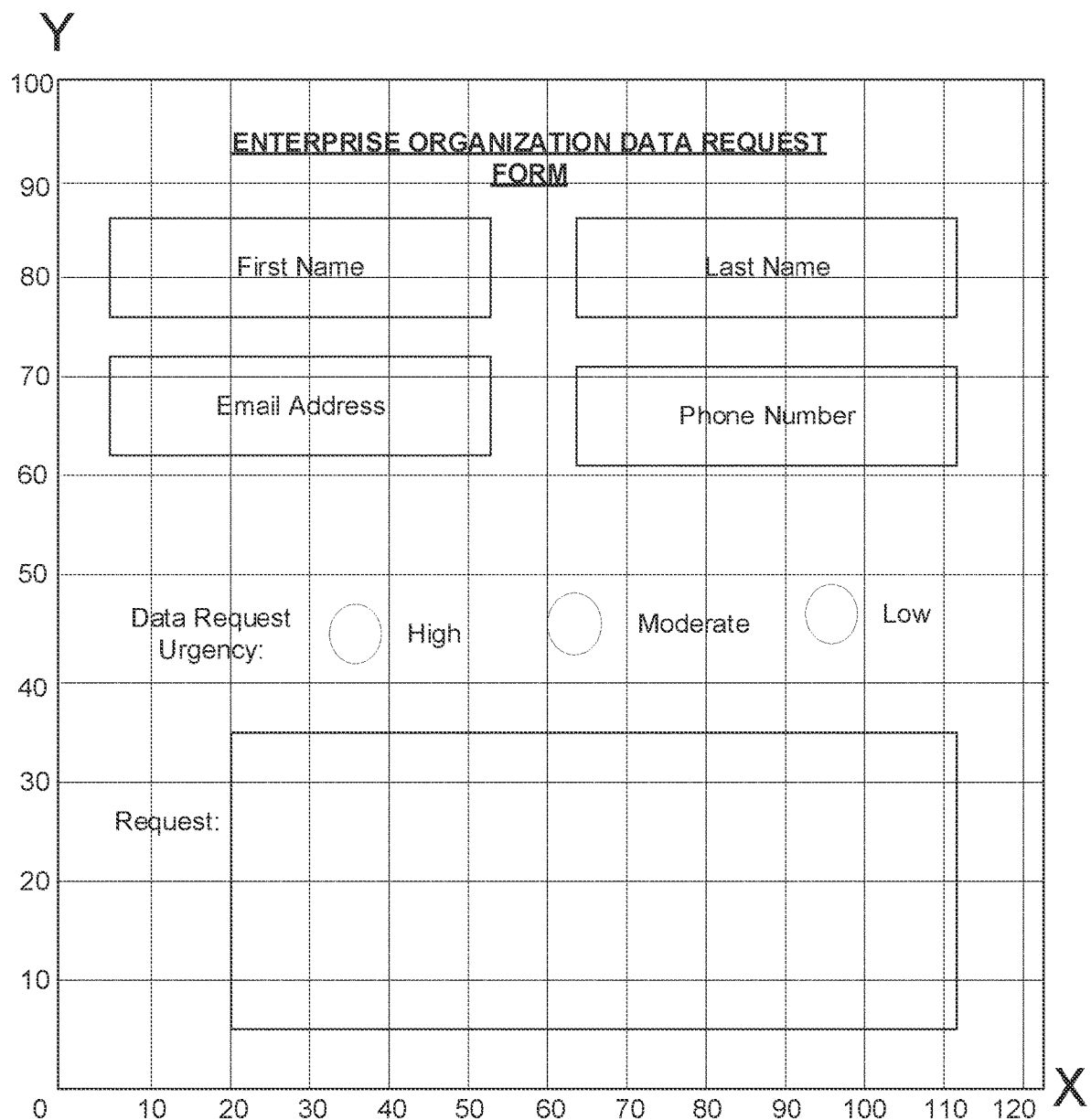
FIG. 5 depicts an illustrative Cartesian coordinate plane on a data request form for detecting and preventing botnet attacks using client-specific event payloads in accordance with one or more example embodiments.

At step 210, mapping unit 113 may determine the location of each event stored within the data structure. To determine the location of each event, mapping unit 113 may superimpose a coordinate system (e.g., a Cartesian coordinate system) onto the data request form. The coordinate system might not be visible on display device 118 of client computing device 110, but may be visible to mapping unit 113 as mapping unit 113 monitors peripheral devices 116. Mapping unit 113 may use the coordinate system (e.g., the Cartesian coordinate system) to indicate the location(s) (e.g., an X-coordinate and a Y-coordinate) where client computing device 110 utilizes peripheral devices 116 (e.g., an X-coordinate and a Y-coordinate that indicate the location of a data entry field that requests a first name, an X-coordinate and a Y-coordinate that indicate the location of the mouse click within the data entry field that requests the first name, an X-coordinate and a Y-coordinate that indicate the location within the data entry field where the first name is entered, or the like). FIG. 5 depicts a sample Cartesian coordinate plane superimposed onto the data request form to determine the location of the events. As illustrated in FIG. 5, the bottommost edge of the data request form may correspond to the X-axis and the left-most edge of the data request form may correspond to the Y-axis.

At step 211, mapping unit 113 may store the events detected in step 205, the categorization of events determined in step 209, and the Cartesian coordinates of each event determined in step 210, within the data structure. As illustrated in FIG. 6, mapping unit 113 may add columns to the table and may store the categorization of each event in a new column (e.g., "Used mouse to select a data entry field," "Used keyboard to type within the data entry field," or the like) and may store the location of each event in a new column.

Figure 2D:
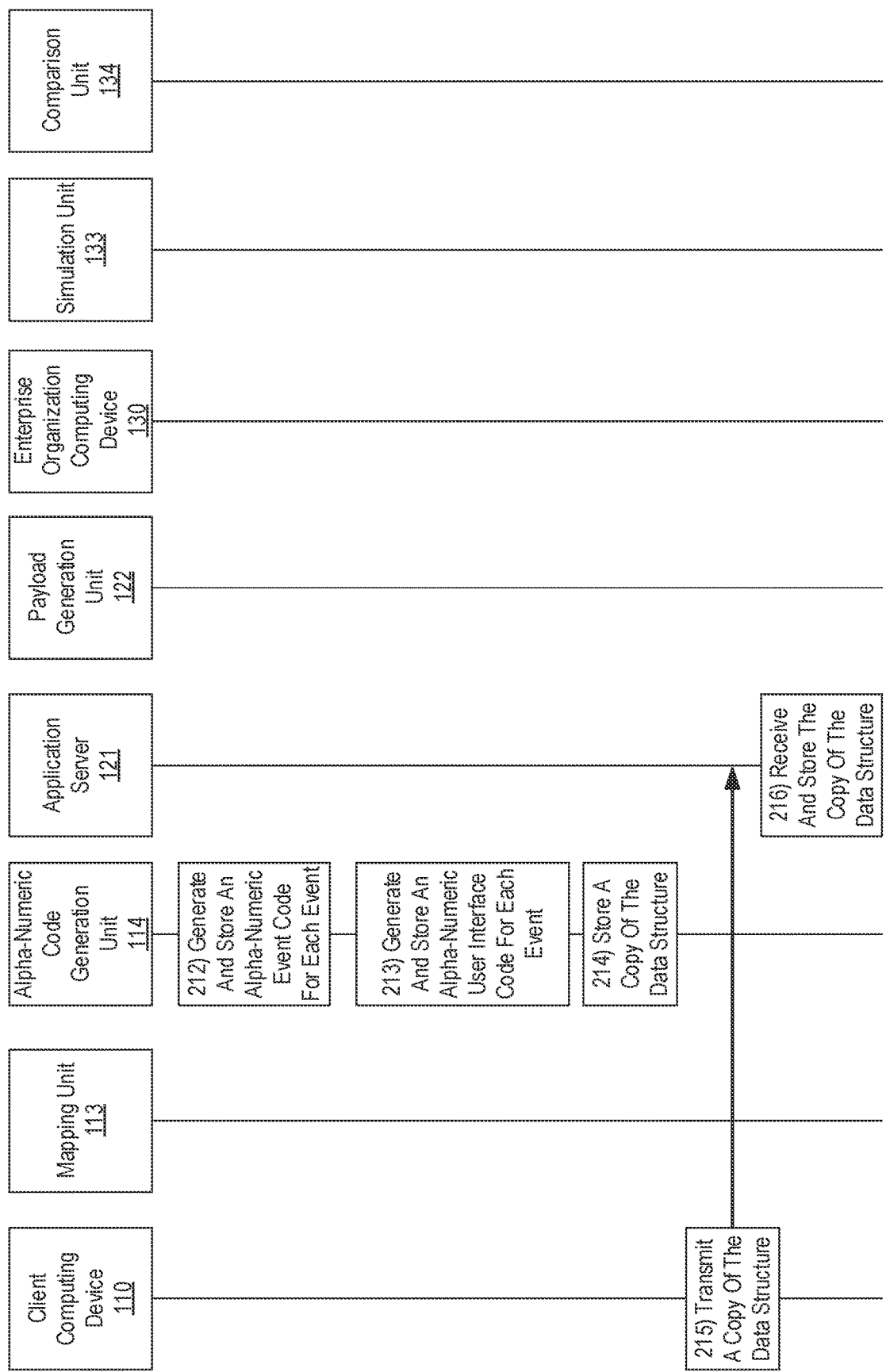

Referring to FIG. 2D, at step 212, alpha-numeric code generation unit 114 of client computing device 110 may use the data within the data structure (e.g., the events, the categorization of the events, the location of the events, or the like) to generate an alpha-numeric event code for each event in the data structure. Each alpha-numeric event code may describe an event (e.g., "click," "scroll," "type," or the like) and may comprise a unique identification number. Each combination of the description and the unique identification number may correspond to a single event. As illustrated in FIG. 6, the data structure may contain a plurality of alpha-numeric event codes (e.g., "CLICK0000" which may correspond to "Clicked on FIRST NAME Data Entry Field," "TYPE1111" which may correspond to "Typed a First Name," or the like). Alpha-numeric code generation unit 114 may store the alpha-numeric event codes within the data structure, as illustrated in FIG. 6.

At step 213, alpha-numeric code generation unit 114 of client computing device 110 may use the data within the data structure (e.g., the events, the categorization of the events, the location of the events, or the like) to generate an alpha-numeric user interface code for each event in the data structure. Each alpha-numeric user interface code may comprise a unique identification number that corresponds to an event such that the event may be identified based on the alpha-numeric user interface code. As illustrated in FIG. 6, the data structure may contain a plurality of alpha-numeric user interface codes (e.g., "UI_CD_5555" may correspond to "Used mouse to select a data entry field," "UI_CD_6666" may correspond to "Used keyboard to type within the data entry field," "UI_CD_7777" may correspond to "Used mouse to scroll through the data request form," or the like). Alpha-numeric code generation unit 114 may store the alpha-numeric user interface codes within the data structure, as illustrated in FIG. 6.

At step 214, alpha-numeric code generation unit 114 may store a copy of the data structure in mapped events database 115. Alpha-numeric code generation unit 114 may be associated with a first level of accessibility of mapped events database 115 (e.g., a least restrictive level of accessibility). Alpha-numeric code generation unit 114 may perform functions on the data within mapped events database 115 (e.g., access the data structures, add new data structures, remove data structures, or the like).

At step 215, client computing device 110 may transmit, using communication interface(s) 117 and across network 140, a copy of the data structure to application server 121. At step 216, application server 121 may receive, from client computing device 110, the copy of the data structure that contains the alpha-numeric event codes and the alpha-numeric user interface codes. Application server 121 may store the copy of the data structure in alpha-numeric codes database 123. Application server 121 may be associated with the least restrictive level of access to alpha-numeric codes database 123 and, as such, may perform functions on the data within alpha-numeric codes database 123 (e.g., access data, add data, remove data, or the like).

Figure 2E:
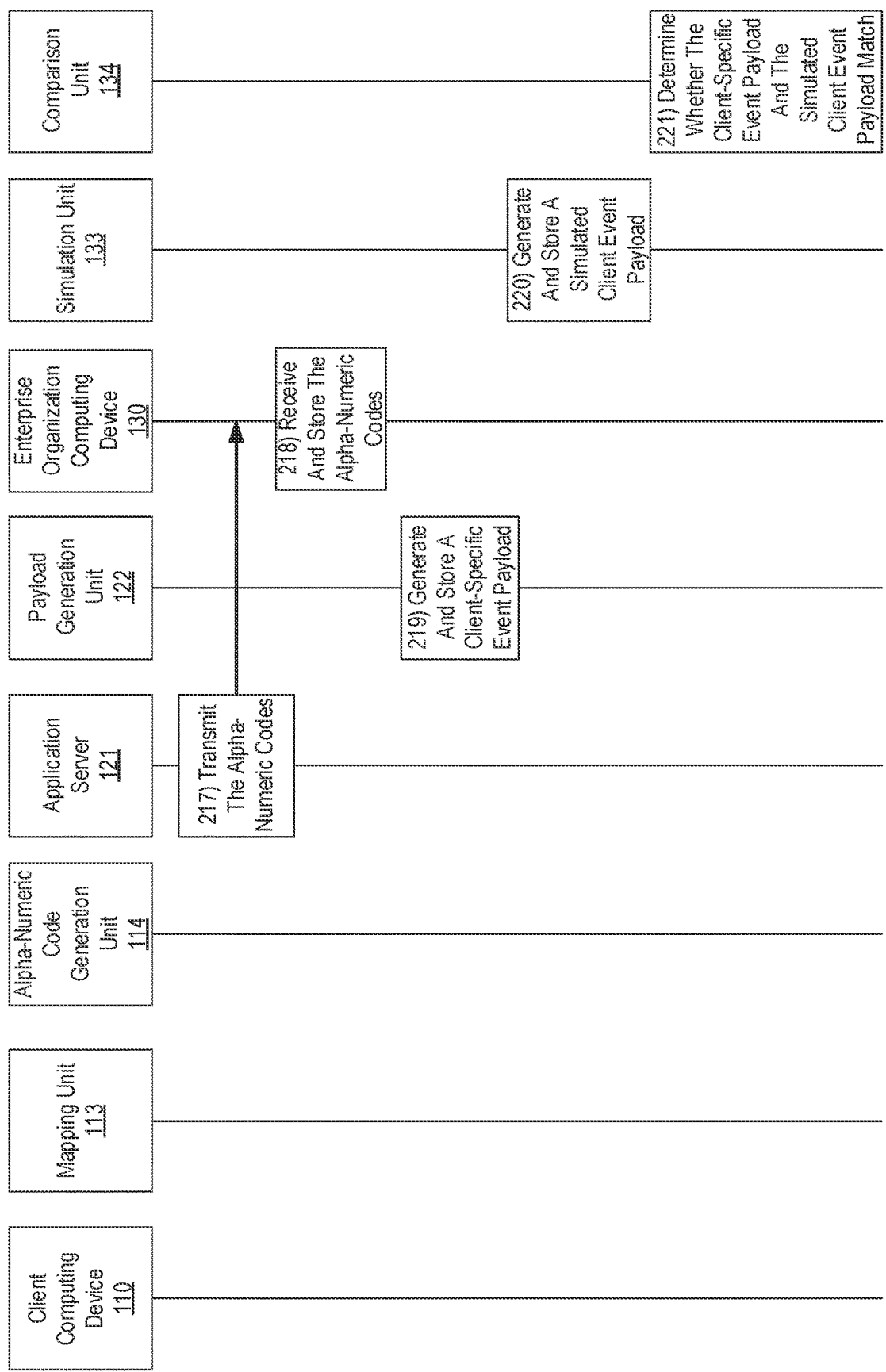

Referring to FIG. 2E, at step 217, application server 121 may transmit, to enterprise organization computing device 130 and across network 140, the alpha-numeric event codes and the alpha-numeric user interface codes. At step 218, enterprise organization computing device 130 may receive, from application server 121, the alpha-numeric event codes and the alpha-numeric user interface codes. Enterprise organization computing device 130 may store the alpha-numeric event codes and the alpha-numeric user interface codes in received alpha-numeric codes database 135. Enterprise organization computing device 130 may be associated with the least restrictive level of access to received alpha-numeric codes database 135 and, as such, may perform functions on the data within received alpha-numeric codes database 135 (e.g., access data, add data, remove data, or the like).

At step 219, payload generation unit 122 of enterprise infrastructure 120 may use the data within the data structure (e.g., the events, the alpha-numeric event codes, the alpha-numeric user interface codes, the location of the events, the categorization of the events, or the like) to generate a client-specific event payload. The data within the data structure may be generated using peripheral devices 116 associated with client computing device 110. If client computing device 110 does not utilize peripheral devices 116 to populate the data request form, then client computing device 110 might not be associated with a client-specific event payload. For example, a botnet may be configured (e.g., programmed, coded, or the like) to populate the data request form and, as such, might not require peripheral devices 116 because the botnet might not be required to manually populate the data request form. Consequently, the botnet might not generate data (e.g., the events, the alpha-numeric event codes, the alpha-numeric user interface codes, the location of the events, the categorizations of the events, or the like) that describes how the botnet utilized peripheral devices 116 to populate the data request form. Payload generation unit 122 may store the client-specific event payload within payloads database 124.

At step 220, simulation unit 133 of enterprise organization computing device 130 may use the alpha-numeric event codes, the alpha-numeric user interface codes, and the populated data request form to generate a simulated client event payload. Simulation unit 133 may retrieve, from database 125, the populated data request form. Simulation unit 133 may identify data entry fields on the data request form that are populated and may determine a movement associated with a peripheral device that may have been necessary or may be expected to populate the data entry fields. For example, simulation unit 133 may determine that a data entry field is populated. Simulation unit 133 may determine that a mouse may be needed or expected to click into the data entry field and that a keyboard may be needed or expected to populate the data entry field. Simulation unit 133 may predict that at least one event associated with a mouse (e.g., at least one click event) and at least one event associated with a keyboard (e.g., at least one type event) may be needed or expected to populate the data request form. As such, simulation unit 133 may generate alpha-numeric event codes and alpha-numeric user interface codes that correspond to the predicted events, and may use the alpha-numeric event codes and alpha-numeric user interface codes to generate the simulated client event payload.

Simulation unit 133 may also use the alpha-numeric event codes and the alpha-numeric user interface codes, received by enterprise organization computing device 130 in step 218, to identify the events (e.g., movements associated with peripheral devices 116) that client computing device 110 executed while populating the request to access to the enterprise organization data. For example, the received alpha-numeric codes may indicate that client computing device 110 used a keyboard to populate a plurality of data entry fields and used a mouse to submit the data request form. As such, simulation unit 133 may generate alpha-numeric event codes and alpha-numeric user interface codes that predict at least one typing event and at least one click event.

The simulated client event payload may be associated with a legitimate client user (e.g., a single user device) and, as such, may contain alpha-numeric event codes and alpha-numeric user interface codes that correspond to the events that were detected by mapping unit 113. Alternatively, the simulated client event payload may be associated with an unauthorized client user (e.g., a botnet) and, as such, might contain alpha-numeric event codes and alpha-numeric user interface codes that predict the events that may have been necessary to populate the data request form since the botnet may be programmed to populate the data request form and might not use peripheral devices 116 to populate the data request form. Simulation unit 133 may store the simulated client event payload within payloads database 124.

At step 221, comparison unit 134 of enterprise organization computing device 130 may determine whether the simulated client event payload and the client-specific event payload match to determine the origin of the request to access the enterprise organization data (e.g., whether the request to access the enterprise organization data originated from a single client user device, a botnet, or the like). Comparison unit 134 may retrieve, from payloads database 124, both the client-specific event payload and the simulated client event payload. Comparison unit 134 may review the alpha-numeric event codes and the alpha-numeric user interface codes within the simulated client event payload and the client-specific event payload. Comparison unit 134 may determine whether the alpha-numeric event codes and the alpha-numeric user interface codes within the simulated client event payload match the alpha-numeric event codes and the alpha-numeric user interface codes within the client-specific event payload. In particular, comparison unit 134 may determine whether the predicted events within the simulated client event payload match the detected events within the client-specific event payload.

If the simulated client event payload matches the client-specific event payload (e.g., both the simulated client event payload and the client-specific event payload contain identical alpha-numeric event codes and identical alpha-numeric user interface codes, or the like), then comparison unit 134 may determine that the events predicted by simulation unit 133 match the events detected by mapping unit 113. In particular, comparison unit 134 may determine that a predicted movement, associated with a peripheral device, that may have been necessary or expected to populate the data request form matches a detected movement, associated with a peripheral device, that was used to populate the data request form. For example, if the simulated client event payload indicates that at least one typing event may be needed or expected to populate the data request form and if the client-specific event payload indicates that a typing event was detected, then comparison unit 134 may determine that the simulated client event payload and the client-specific event payload match. As such, comparison unit 134 may determine that client computing device 110 is associated with a legitimate client user (e.g., single client user device). If comparison unit 134 determines that client computing device 110 is associated with a legitimate client user (e.g., single client user device), then comparison unit 134 may determine that the request to access the enterprise organization data should be processed.

Alternatively, if the simulated client event payload does not match the client-specific event payload (e.g., the alpha-numeric event codes and the alpha-numeric user interface codes within the client-specific event payload and the simulated client event payload do not match, or the like), then comparison unit 134 may determine that the events predicted by simulation unit 133 do not match the events detected by mapping unit 113. In particular, comparison unit 134 may determine that a predicted movement, associated with a peripheral device, that may have been necessary or expected to populate the data request form does not match the detected movements, associated with a peripheral device, that were used to populate the data request form. For example, if the simulated client event payload indicates that at least one clicking event may be needed or expected to populate the data request form, but the client-specific event payload does not indicate that a clicking event was detected, then comparison unit 134 may determine that the simulated client event payload and the client-specific event payload do not match. As such, comparison unit 134 may determine that client computing device 110 is associated with an unauthorized client user (e.g., a botnet). If comparison unit 134 determines that client computing device 110 is associated with an unauthorized user (e.g., a botnet), then comparison unit 134 may determine that the request to access the enterprise organization data should be denied.

Figure 2F:
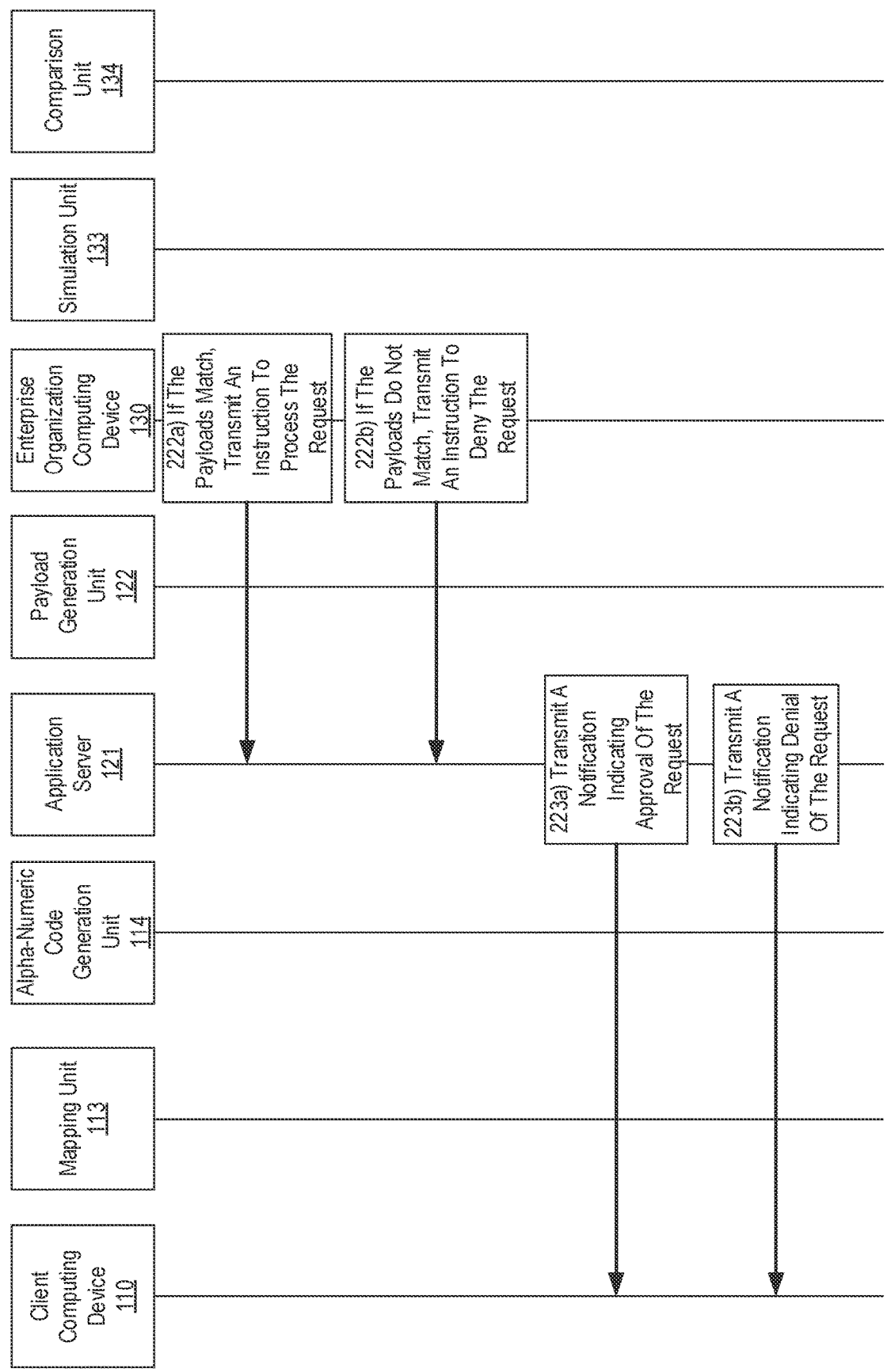

If, at step 221, comparison unit 134 determines that the alpha-numeric event codes and the alpha-numeric user interface codes within the simulated client event payload and the client-specific event payload match, then, referring to FIG. 2F and at step 222a, enterprise organization computing device 130 may transmit, to application server 121 and using communication interface(s) 136, instructions to process the request to access the enterprise organization data.

Alternatively, if, at step 221, comparison unit 134 determines that the alpha-numeric event codes and the alpha-numeric user interface codes within the simulated client event payload and the client-specific event payload do not match, then, referring to FIG. 2F and at step 222b, enterprise organization computing device 130 may transmit, to application server 121 and using communication interface(s) 136, instructions to deny the request to access the enterprise organization data.

If, at step 222a, application server 121 receives, from communication interface(s) 136 of enterprise organization computing device 130, instructions to process the request to access the enterprise organization data, then, at step 223a, application server 121 may transmit, to communication interface(s) 117 of client computing device 110, a notification indicating approval of the request to access the enterprise organization data.

Alternatively, if, at step 222b, application server 121 receives, from communication interface(s) 136 of enterprise organization computing device 130, instructions to deny the request to access the enterprise organization data, then, at step 223b, application server 121 may transmit, to communication interface(s) 117 of client computing device 110, a notification indicating denial of the request to access the enterprise organization data.

Figure 3:
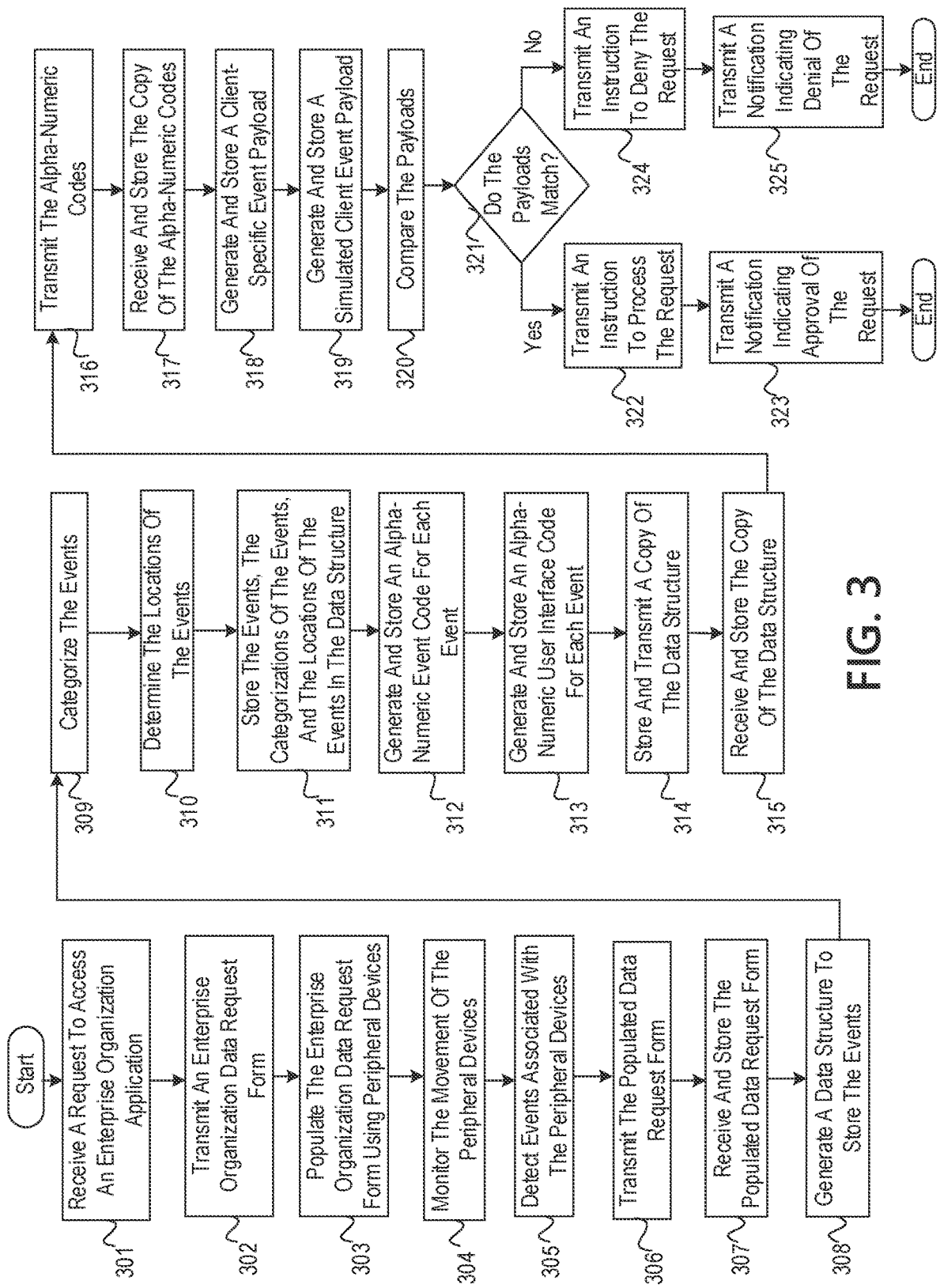
FIG. 3 depicts an illustrative method for detecting and preventing botnet attacks using client-specific event payloads in accordance with one or more example embodiments.

FIG. 3 depicts a flow diagram illustrating one example method for detecting and preventing botnet attacks using client-specific event payloads in accordance with one or more aspects described herein. The processes illustrated in FIG. 3 are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIG. 3 may be performed in real-time or near real-time.

At step 301, application server 121 may receive, from client computing device 110, a request to access an enterprise organization application (e.g., an enterprise organization request submission portal, an Internet website associated with the enterprise organization, or the like). Client computing device 110 may transmit the request across network 140 and using communication interface(s) 117.

At step 302, application server 121 may allow client computing device 110 to access the enterprise organization application and may transmit, to communication interface(s) 117 of client computing device 110 and across network 140, an enterprise organization data request form. FIG. 4 depicts an illustrative example of a data request form. As illustrated in FIG. 4, the data request form may comprise data entry fields, radio button selections, or the like.

At step 303, client computing device 110 may receive, from application server 121, the data request form and may populate the data request form using peripheral devices 116. Client computing device 110 may use peripheral devices 116 (e.g., a mouse, a keyboard, a printer, an external drive, a hard disk, or the like) to navigate the data request form (e.g., scroll through the data request form, select a data entry field, click within a data entry field, highlight a data entry field, advance to the next page of data request form, return to a previous page of the data request form, or the like). Client computing device 110 may populate the data request form using peripheral devices 116 (e.g., select an option within a drop-down menu associated with a data entry field, highlight a radio button associated with a data entry field, type a response within a data entry field, or the like).

At step 304, mapping unit 113 of client computing device 110 may monitor the movement of peripheral devices 116. To do so, mapping unit 113 may identify peripheral devices 116 that are associated with client computing device 110 and may determine whether client computing device 110 interacts with peripheral devices 116 (e.g., whether client computing device 110 clicks a button on a mouse, uses the mouse to scroll through the data request form, uses a keyboard to populate a data entry field, uses the mouse to select a radio button, or the like).

At step 305, mapping unit 113 may determine that client computing device 110 interacts with peripheral devices 116 and may detect the movement of peripheral devices 116. Each detected movement of peripheral devices 116 may be an event (e.g., a mouse click, scroll, key press, or the like may each be an event). For example, using the sample data request form in FIG. 4, mapping unit 113 may determine that client computing device 110 uses a mouse to click into the FIRST NAME data entry field, to scroll to down to the PHONE NUMBER data entry field, and to click into the PHONE NUMBER data entry field.

At step 306, mapping unit 113 may transmit, across network 140 and using communication interface(s) 117 of client computing device 110, the populated data request form to application server 121. At step 307, application server 121 may store the populated data request form in database 125.

At step 308, mapping unit 113 may generate a data structure (e.g., a two-dimensional data structure such as a table, or the like) to store the events detected in step 305. FIG. 6 depicts a sample data structure associated with a single client user device (e.g., a legitimate client user) that mapping unit 113 may generate to store the detected events. As illustrated in FIG. 6, mapping unit 113 may generate a table and may store each detected event in the table (e.g., "Clicked on FIRST NAME Data Entry Field," "Typed a First Name," or the like).

At step 309, mapping unit 113 may categorize each event stored within the data structure. To categorize each event, mapping unit 113 may describe how client computing device 110 interacts with peripheral devices 116 (e.g., uses a mouse to navigate to a data entry field that requests a first name, uses a keyboard to type within the data entry field, or the like).

At step 310, mapping unit 113 may determine the location of each event stored within the data structure. To determine the location of each event, mapping unit 113 may superimpose a coordinate system (e.g., a Cartesian coordinate system) onto the data request form. The coordinate system might not be visible on display device 118 of client computing device 110, but may be visible to mapping unit 113 as mapping unit 113 monitors peripheral devices 116. Mapping unit 113 may use the coordinate system (e.g., the Cartesian coordinate system) to indicate the location(s) (e.g., an X-coordinate and a Y-coordinate) where client computing device 110 utilizes peripheral devices 116 (e.g., an X-coordinate and a Y-coordinate that indicate the location of a data entry field that requests a first name, an X-coordinate and a Y-coordinate that indicate the location of the mouse click within the data entry field that requests the first name, or the like). FIG. 5 depicts a sample Cartesian coordinate plane superimposed onto the data request form to determine the location of the events. As illustrated in FIG. 5, the bottom-most edge of the data request form may correspond to the X-axis and the left-most edge of the data request form may correspond to the Y-axis.

At step 311, mapping unit 113 may store the events detected in step 305, the categorization of events determined in step 309, and the Cartesian coordinates of each event determined in step 310, within the data structure, as illustrated in FIG. 6.

At step 312, alpha-numeric code generation unit 114 of client computing device 110 may use the data within the data structure (e.g., the events, the categorization of the events, the location of the events, or the like) to generate an alpha-numeric event code for each event in the data structure. Each alpha-numeric event code may describe an event (e.g., "click," "scroll," "type," or the like) and may comprise a unique identification number. Each combination of the description and the unique identification number may correspond to a single event. Alpha-numeric code generation unit 114 may store the alpha-numeric event codes within the data structure, as illustrated in FIG. 6.

At step 313, alpha-numeric code generation unit 114 of client computing device 110 may use the data within the data structure (e.g., the events, the categorization of the events, the location of the events, or the like) to generate an alpha-numeric user interface code for each event in the data structure. Each alpha-numeric user interface code may comprise a unique identification number that corresponds to an event such that the event may be identified based on the alpha-numeric user interface code. Alpha-numeric code generation unit 114 may store the alpha-numeric user interface codes within the data structure, as illustrated in FIG. 6.

At step 314, alpha-numeric code generation unit 114 of client computing device 110 may store a copy of the data structure in mapped events database 115. Client computing device 110 may transmit, using communication interface(s) 117 and across network 140, a copy of the data structure to application server 121.

At step 315, application server 121 may receive, from client computing device 110, the copy of the data structure that contains the alpha-numeric event codes and the alpha-numeric user interface codes. Application server 121 may store the copy of the data structure in alpha-numeric codes database 123.

At step 316, application server 121 may transmit, to enterprise organization computing device 130 and across network 140, the alpha-numeric event codes and the alpha-numeric user interface codes.

At step 317, enterprise organization computing device 130 may receive, from application server 121, the alpha-numeric event codes and the alpha-numeric user interface codes. Enterprise organization computing device 130 may store the alpha-numeric event codes and the alpha-numeric user interface codes in received alpha-numeric codes database 135.

At step 318, payload generation unit 122 of enterprise infrastructure 120 may use the data within the data structure (e.g., the events, the alpha-numeric event codes, the alpha-numeric user interface codes, the location of the events, the categorization of the events, or the like) to generate a client-specific event payload. The data within the data structure may be generated using peripheral devices 116 associated with client computing device 110. If client computing device 110 does not utilize peripheral devices 116 to populate the data request form, then client computing device 110 might not be associated with a client-specific event payload. For example, a botnet may be configured (e.g., programmed, coded, or the like) to populate the data request form and, as such, might not require peripheral devices 116 because the botnet might not be required to manually populate the data request form. Consequently, the botnet might not generate data (e.g., the events, the alpha-numeric event codes, the alpha-numeric user interface codes, the location of the events, the categorizations of the events, or the like) that describes how the botnet utilized peripheral devices 116 to populate the data request form. Payload generation unit 122 may store the client-specific event payload within payloads database 124.

At step 319, simulation unit 133 of enterprise organization computing device 130 may use the alpha-numeric event codes, the alpha-numeric user interface codes, and the populated data request form to generate a simulated client event payload. Simulation unit 133 may retrieve, from database 125, the populated data request form. Simulation unit 133 may identify data entry fields on the data request form that are populated and may determine a movement associated with a peripheral device that may have been necessary to populate the data entry fields. For example, if a data entry field that requests a first name is populated, then simulation unit 133 may determine that a mouse may be needed or expected to click into the data entry field and that a keyboard may be needed or expected to type the first name. Therefore, simulation unit 133 may predict that at least one event associated with a mouse (e.g., at least one click event) and at least one event associated with a keyboard (e.g., at least one type event) may be needed or expected to populate the data request form. As such, simulation unit 133 may generate alpha-numeric event codes and alpha-numeric user interface codes that correspond to the predicted events, and may use the alpha-numeric event codes and alpha-numeric user interface codes to generate the simulated client event payload.

Simulation unit 133 may also use the alpha-numeric event codes and the alpha-numeric user interface codes, received by enterprise organization computing device 130 in step 317, to identify the events (e.g., movements associated with peripheral devices 116) that client computing device 110 executed while populating the request to access to the enterprise organization data. For example, the received alpha-numeric codes may indicate that client computing device 110 used a keyboard to populate a plurality of data entry fields and used a mouse to submit the data request form. As such, simulation unit 133 may generate alpha-numeric event codes and alpha-numeric user interface codes that predict at least one typing event and at least one click event.

The simulated client event payload may be associated with a legitimate client user (e.g., a single user device) and, as such, may contain alpha-numeric event codes and alpha-numeric user interface codes that correspond to the events that were detected by mapping unit 113. Alternatively, the simulated client event payload may be associated with an unauthorized client user (e.g., a botnet) and, as such, might contain alpha-numeric event codes and alpha-numeric user interface codes that predict the events that may have been necessary to populate the data request form since the botnet may be programmed to populate the data request form and might not use peripheral devices 116 to populate the data request form. Simulation unit 133 may store the simulated client event payload within payloads database 124.

At step 320, comparison unit 134 of enterprise organization computing device 130 may determine whether the simulated client event payload and the client-specific event payload match to determine the origin of the request to access the enterprise organization data (e.g., whether the request to access the enterprise organization data originated from a single client user device, a botnet, or the like). Comparison unit 134 may retrieve, from payloads database 124, both the client-specific event payload and the simulated client event payload. Comparison unit 134 may review the alpha-numeric event codes and the alpha-numeric user interface codes within the simulated client event payload and the client-specific event payload. Comparison unit 134 may determine whether the alpha-numeric event codes and the alpha-numeric user interface codes within the simulated client event payload match the alpha-numeric event codes and the alpha-numeric user interface codes within the client-specific event payload. In particular, comparison unit 134 may determine whether the predicted events within the simulated client event payload match the detected events within the client-specific event payload.

At step 321, comparison unit 134 may determine whether the alpha-numeric event codes and the alpha-numeric user interface codes within the simulated client event payload match the alpha-numeric event codes and the alpha-numeric user interface codes within the client-specific event payload.

If the simulated client event payload matches the client-specific event payload (e.g., both the simulated client event payload and the client-specific event payload contain identical alpha-numeric event codes and identical alpha-numeric user interface codes, or the like), then comparison unit 134 may determine that the events predicted by simulation unit 133 match the events detected by mapping unit 113. In particular, comparison unit 134 may determine that a predicted movement, associated with a peripheral device, that may have been necessary to populate the data request form matches a detected movement, associated with a peripheral device, that was used to populate the data request form. As such, comparison unit 134 may determine that client computing device 110 is associated with a legitimate client user (e.g., single client user device). If comparison unit 134 determines that client computing device 110 is associated with a legitimate client user (e.g., single client user device), then comparison unit 134 may determine that the request to access the enterprise organization data should be processed.

Alternatively, if the simulated client event payload does not match the client-specific event payload (e.g., the alpha-numeric event codes and the alpha-numeric user interface codes within the client-specific event payload and the simulated client event payload do not match, or the like), then comparison unit 134 may determine that the events predicted by simulation unit 133 do not match the events detected by mapping unit 113. In particular, comparison unit 134 may determine that a predicted movement, associated with a peripheral device, that may have been necessary to populate the data request form does not match the detected movements, associated with a peripheral device, that were used to populate the data request form. As such, comparison unit 134 may determine that client computing device 110 is associated with an unauthorized client user (e.g., a botnet). If comparison unit 134 determines that client computing device 110 is associated with an unauthorized user (e.g., a botnet), then comparison unit 134 may determine that the request to access the enterprise organization data should be denied.

If at step 321, comparison unit 134 determines that the alpha-numeric event codes and the alpha-numeric user interface codes within the simulated client event payload and the client-specific event payload match, then, at step 322, enterprise organization computing device 130 may transmit, to application server 121 and using communication interface(s) 136, instructions to process the request to access the enterprise organization data. If, at step 322, application server 121 receives, from communication interface(s) 136 of enterprise organization computing device 130, instructions to process the request to access the enterprise organization data, then, at step 323, application server 121 may transmit, to communication interface(s) 117 of client computing device 110, a notification indicating approval of the request to access the enterprise organization data.

Alternatively, if at step 321, comparison unit 134 determines that the alpha-numeric event codes and the alpha-numeric user interface codes within the simulated client event payload and the client-specific event payload do not match, then, at step 324, enterprise organization computing device 130 may transmit, to application server 121 and using communication interface(s) 136, instructions to deny the request to access the enterprise organization data. If, at step 324, application server 121 receives, from communication interface(s) 136 of enterprise organization computing device 130, instructions to deny the request to access the enterprise organization data, then, at step 325, application server 121 may transmit, to communication interface(s) 117 of client computing device 110, a notification indicating denial of the request to access the enterprise organization data.

As a result, the proposed solution may provide the following benefits: 1) client-specific event mapping using alpha-numeric event codes and alpha-numeric user interface codes; 2) real time, or near real time, data request monitoring to prevent overload of an application server; 3) real time, or near real time, detection of unauthorized requests to access enterprise organization data; and 4) real time, or near real time, prevention of harmful or potentially harmful data requests One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    at a computing device including at least one or more processors and memory:
        transmitting, from a client computing device and to an application server, a request to access an enterprise organization application;
        generating, by the client computing device and using a request form, a request to access enterprise organization data;
        detecting, by the client computing device, a plurality of events;
        categorizing each detected event of the plurality of events, wherein categorizing each event includes describing how the client computing device interacted with a peripheral device of the client computing device to generate a respective event;
        determining, based on a Cartesian coordinate system superimposed onto the request form, a location of each event of the plurality of events;
        generating, by the client computing device and based on the categorizing of each event of the plurality of events and the location of each event of the plurality of events, a plurality of alpha-numeric codes, wherein each alpha-numeric code corresponds to an event of the plurality of events;
        transmitting, from the client computing device and to the application server, the plurality of alpha-numeric codes;
        generating, by the application server, a client-specific event payload;
        transmitting, from the application server and to an enterprise organization, the plurality of alpha-numeric codes;
        generating, by the enterprise organization, a simulated client event payload;
        comparing, by the enterprise organization, the client-specific event payload to the simulated client event payload, wherein the comparing the client-specific event payload to the simulated client event payload comprises determining whether predicted movements, associated with a plurality of peripheral devices, stored in the simulated client event payload match detected movements, associated with the plurality of peripheral devices, stored in the client-specific event payload; and
        determining, by the enterprise organization, whether to approve the request based on the comparison.

2. The method of claim 1, wherein the plurality of alpha-numeric codes comprises alpha-numeric event codes and alpha-numeric user interface codes, and wherein the alpha-numeric event codes and the alpha-numeric user interface codes correspond to detected movements associated with a plurality of peripheral devices.

3. The method of claim 2, wherein each peripheral device of the plurality of peripheral devices comprises at least one of:
    a mouse;
    a keyboard;
    a monitor;
    a printer;
    a hard disk; or
    a speaker.

4. The method of claim 1, further comprising receiving, by the client computing device and from the application server, the request form, wherein the request form comprises data entry fields that request at least one of:
    a first name associated with a client;
    a last name associated with the client;
    an email address associated with the client;
    a phone number associated with the client; and
    the request.

5. The method of claim 1, further comprising:
    generating an alpha-numeric event code for each event of the plurality of events, wherein the generating the alpha-numeric event code comprises generating a description of the event and a first unique identification number that corresponds to the event; and
    generating an alpha-numeric user interface code for each event of the plurality of events, wherein the generating the alpha-numeric user interface code comprises generating a unique identifier that corresponds to the event and a second unique identification number that corresponds to the event.

6. The method of claim 5, wherein the generating the client-specific event payload comprises:
generating a data structure, wherein the data structure is configured to store:
the plurality of events;
the alpha-numeric event codes;
the alpha-numeric user interface codes;
the description of each event of the plurality of events;
the category of each event of the plurality of events; and
the location of each event of the plurality of events.

7. The method of claim 1, wherein the generating the simulated client event payload comprises generating a data structure, wherein the data structure is configured to store:
the plurality of alpha-numeric codes; and
additional alpha-numeric codes, wherein the additional alpha-numeric codes correspond to additional alpha-numeric event codes and additional alpha-numeric user interface codes, and wherein the additional alpha-numeric event codes and the additional alpha-numeric user interface codes correspond to predicted movements associated with a plurality of peripheral devices.

8. The method of claim 1, further comprising transmitting, by the application server and to the client computing device, a notification indicating one of:
approval of the request based on the comparison; or
denial of the request based on the comparison.

9. The method of claim 1, further comprising determining to:
approve, by the enterprise organization, the request based on determining that the predicted movements stored in the simulated client event payload match the detected movements stored in the client-specific event payload; or
deny, by the enterprise organization, the request based on determining that the predicted movements stored in the simulated client event payload do not match the detected movements stored in the client-specific event payload.

10. A computing platform comprising:
a processor;
a communication interface communicatively coupled to the processor; and
memory storing computer-readable instructions that, when executed by the processor, cause the computing platform to:
transmit, from a client computing device and to an application server, a request to access an enterprise organization application;
generate, by the client computing device and using a request form, a request to access enterprise organization data;
detect, by the client computing device, a plurality of events;
categorize each detected event of the plurality of events, wherein categorizing each event includes describing how the client computing device interacted with a peripheral device of the client computing device to generate a respective event;
determine, based on a Cartesian coordinate system superimposed onto the request form, a location of each event of the plurality of events;
generate, by the client computing device and based on the categorizing of each event of the plurality of events and the location of each event of the plurality of events, a plurality of alpha-numeric codes, wherein each alpha-numeric code corresponds to an event of the plurality of events;
transmit, from the client computing device and to the application server, the plurality of alpha-numeric codes;
generate, by the application server, a client-specific event payload;
transmit, from the application server and to an enterprise organization, the plurality of alpha-numeric codes;
generate, by the enterprise organization, a simulated client event payload;
compare, by the enterprise organization, the client-specific event payload to the simulated client event payload, wherein the comparing the client-specific event payload to the simulated client event payload comprises determining whether predicted movements, associated with a plurality of peripheral devices, stored in the simulated client event payload match detected movements, associated with the plurality of peripheral devices, stored in the client-specific event payload; and
determine, by the enterprise organization, whether to approve the request based on the comparison.

11. The computing platform of claim 10, wherein the instructions, when executed, further cause the computing platform to:
generate an alpha-numeric event code for each event of the plurality of events, wherein the generating the alpha-numeric event code comprises generating a description of the event and a first unique identification number that corresponds to the event; and
generate an alpha-numeric user interface code for each event of the plurality of events, wherein the generating the alpha-numeric user interface code comprises generating a unique identifier that corresponds to the event and a second unique identification number that corresponds to the event.

12. The computing platform of claim 11, wherein the generating the client-specific event payload further causes the computing platform to:
generate a data structure, wherein the data structure is configured to store:
the plurality of events;
the alpha-numeric event codes;
the alpha-numeric user interface codes;
the description of each event of the plurality of events;
the category of each event of the plurality of events; and
the location of each event of the plurality of events.

13. The computing platform of claim 10, wherein the generating the simulated client event payload further causes the computing platform to generate a data structure, wherein the data structure is configured to store:
the plurality of alpha-numeric codes; and
additional alpha-numeric codes, wherein the additional alpha-numeric codes correspond to additional alpha-numeric event codes and additional alpha-numeric user interface codes, and wherein the additional alpha-numeric event codes and the additional alpha-numeric user interface codes correspond to predicted movements associated with a plurality of peripheral devices.

14. The computing platform of claim 10, wherein the instructions, when executed, further cause the computing platform to determine to:
approve, by the enterprise organization, the request based on determining that the predicted movements stored in the simulated client event payload match the detected movements stored in the client-specific event payload; or deny, by the enterprise organization, the request based on determining that the predicted movements stored in the simulated client event payload do not match the detected movements stored in the client-specific event payload.

15. One or more non-transitory computer-readable media storing instructions that, when executed by a computing platform comprising a processor, memory, and a communication interface, cause the computing platform to:

transmit, from a client computing device and to an application server, a request to access an enterprise organization application;

generate, by the client computing device and using a request form, a request to access enterprise organization data;

detect, by the client computing device, a plurality of events;

categorize each detected event of the plurality of events, wherein categorizing each event includes describing how the client computing device interacted with a peripheral device of the client computing device to generate a respective event;

determine, based on a Cartesian coordinate system superimposed onto the request form, a location of each event of the plurality of events;

generate, by the client computing device and based on the categorizing of each event of the plurality of events and the location of each event of the plurality of events, a plurality of alpha-numeric codes, wherein each alpha-numeric code corresponds to an event of the plurality of events;

transmit, from the client computing device and to the application server, the plurality of alpha-numeric codes;

generate, by the application server, a client-specific event payload;

transmit, from the application server and to an enterprise organization, the plurality of alpha-numeric codes;

generate, by the enterprise organization, a simulated client event payload;

compare, by the enterprise organization, the client-specific event payload to the simulated client event payload, wherein the comparing the client-specific event payload to the simulated client event payload comprises determining whether predicted movements, associated with a plurality of peripheral devices, stored in the simulated client event payload match detected movements, associated with the plurality of peripheral devices, stored in the client-specific event payload; and determine, by the enterprise organization, whether to approve the request based on the comparison.

16. The one or more non-transitory computer-readable media of claim 15, wherein the instructions, when executed, further cause the computing platform to:

generate an alpha-numeric event code for each event of the plurality of events, wherein the generating the alpha-numeric event code comprises generating a description of the event and a first unique identification number that corresponds to the event; and generate an alpha-numeric user interface code for each event of the plurality of events, wherein the generating the alpha-numeric user interface code comprises generating a unique identifier that corresponds to the event and a second unique identification number that corresponds to the event.

17. The one or more non-transitory computer-readable media of claim 16, wherein the generating the client-specific event payload further causes the computing platform to:

generate a data structure, wherein the data structure is configured to store:
the plurality of events;
the alpha-numeric event codes;
the alpha-numeric user interface codes;
the description of each event of the plurality of events;
the category of each event of the plurality of events; and
the location of each event of the plurality of events.

18. The one or more non-transitory computer-readable media of claim 15, wherein the generating the simulated client event payload further causes the computing platform to generate a data structure, wherein the data structure is configured to store:

the plurality of alpha-numeric codes; and additional alpha-numeric codes, wherein the additional alpha-numeric codes correspond to additional alpha-numeric event codes and additional alpha-numeric user interface codes, and wherein the additional alpha-numeric event codes and the additional alpha-numeric user interface codes correspond to predicted movements associated with a plurality of peripheral devices.

\* \* \* \* \*